(12) United States Patent
Kadowaki et al.

(10) Patent No.: US 11,697,539 B2
(45) Date of Patent: Jul. 11, 2023

(54) HEAT SEALED LID AND CAN

(71) Applicant: NIPPON STEEL CORPORATION, Tokyo (JP)

(72) Inventors: Nobuo Kadowaki, Tokyo (JP); Kazushi Iwakiri, Tokyo (JP); Tomohiro Mizutani, Tokyo (JP); Satoshi Kato, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 93 days.

(21) Appl. No.: 16/764,290

(22) PCT Filed: Dec. 7, 2018

(86) PCT No.: PCT/JP2018/045134
§ 371 (c)(1),
(2) Date: May 14, 2020

(87) PCT Pub. No.: WO2019/112051
PCT Pub. Date: Jun. 13, 2019

(65) Prior Publication Data
US 2020/0346831 A1    Nov. 5, 2020

(30) Foreign Application Priority Data

Dec. 7, 2017    (JP) .................................. 2017-234894

(51) Int. Cl.
*B32B 15/085*    (2006.01)
*B32B 15/09*    (2006.01)
(Continued)

(52) U.S. Cl.
CPC ............ *B65D 77/2024* (2013.01); *B32B 7/12* (2013.01); *B32B 15/085* (2013.01); *B32B 15/09* (2013.01);
(Continued)

(58) Field of Classification Search
CPC ......... B32B 7/12; B32B 15/08; B32B 15/085; B32B 15/09; B32B 2439/66; B65D 7/36; B65D 7/38; B65D 17/50–505
(Continued)

(56) References Cited

U.S. PATENT DOCUMENTS 3,547,305 A * 12/1970 Khoury ................ B65D 17/502
968/819
4,557,398 A * 12/1985 Hambleton .......... B65D 17/502
220/270

(Continued)

FOREIGN PATENT DOCUMENTS

EP    0408268 A2 *  1/1991  ............ B65D 17/50
EP    2517973 A1 * 10/2012  ............ B65D 17/50
(Continued)

OTHER PUBLICATIONS

"Geometrical Product Specifications (GPS)-Surface texture: Profile method-Terms, definitions and surface texture parameters", JIS B 0601, 2013, total 129 pages.
(Continued)

*Primary Examiner* — Michael C Romanowski
(74) *Attorney, Agent, or Firm* — Birch, Stewart, Kolasch & Birch, LLP

(57) ABSTRACT

A heat sealed lid includes: a resin laminate aluminum foil; and a first seamed side frame portion and a second seamed side frame portion formed of a resin film laminate metal sheet, in which the resin film laminate metal sheet includes a metal sheet, a laminate film formed on one surface of the metal sheet, and a second resin film formed on the other surface of the metal sheet and containing a thermoplastic polyester resin, the laminate film includes an adhesion layer containing a polypropylene-based resin and a polyethylene-based resin and a base layer containing a modified polypropylene-based resin, an amount of the polyethylene-based
(Continued)

resin in the adhesion layer is 1.0 mass % or more and 45.0 mass % or less of the resins of the adhesion layer, the melting point of the second resin film is higher than the melting point of the adhesion layer by 40° C. or more and is higher than the heating temperature of a heat sealing tool, the thickness of the adhesion layer is 1.0 μm or more and 15.0 μm or less, and the thickness of the base layer is 1.0 μm or more and 18.0 μm or less.

4 Claims, 8 Drawing Sheets

(51) Int. Cl.
| | |
|---|---|
| *B32B 15/20* | (2006.01) |
| *B32B 27/32* | (2006.01) |
| *B32B 27/36* | (2006.01) |
| *B32B 7/12* | (2006.01) |
| *B65D 17/34* | (2006.01) |
| *B65D 77/20* | (2006.01) |

(52) U.S. Cl.
CPC .............. *B32B 15/20* (2013.01); *B32B 27/32* (2013.01); *B32B 27/36* (2013.01); *B65D 17/34* (2018.01); *B32B 2435/02* (2013.01); *B32B 2439/66* (2013.01); *B65D 2517/0013* (2013.01); *B65D 2577/205* (2013.01)

(58) Field of Classification Search
USPC ....... 220/203.18, 254.1, 265, 266, 268, 276, 220/359.1, 359.3, 359.4, 906, 907; 428/34.1–36.92
See application file for complete search history.

(56) References Cited

U.S. PATENT DOCUMENTS

| | | | | |
|---|---|---|---|---|
| 4,589,568 A * | 5/1986 | Ito | ............................ | A61J 1/16 220/359.3 |
| 4,867,336 A * | 9/1989 | Stewart | ............. | B29C 66/24221 220/359.3 |
| 5,069,355 A * | 12/1991 | Matuszak | ............ | B65D 17/502 220/270 |
| 5,093,208 A * | 3/1992 | Heyes | ..................... | B32B 15/08 428/623 |
| 5,725,120 A * | 3/1998 | Ramsey | ............. | B65D 77/2024 220/276 |
| 5,752,614 A * | 5/1998 | Nelson | ................. | B65D 17/502 220/254.1 |
| 6,036,043 A * | 3/2000 | Erfgen | ................. | B65D 17/506 220/270 |
| 6,302,321 B1 | 10/2001 | Reese et al. | | |
| 9,475,620 B2 * | 10/2016 | Wallis | ................. | B65D 79/0087 |
| 2004/0211780 A1 * | 10/2004 | Turner | ................. | B21D 51/383 413/4 |
| 2008/0073365 A1 * | 3/2008 | Jouillat | ............. | B65D 77/2088 220/780 |
| 2008/0078766 A1 * | 4/2008 | Oberholzer | ............. | B65D 7/36 220/359.2 |
| 2009/0133830 A1 * | 5/2009 | Kazeoka | ................. | B32B 15/08 156/308.2 |
| 2009/0250464 A1 * | 10/2009 | Jongsma | ........... | B29C 66/83221 220/265 |
| 2009/0261099 A1 * | 10/2009 | Jongsma | ............. | B65D 17/502 220/213 |
| 2011/0127268 A1 * | 6/2011 | Boehler | ............. | B65D 21/0213 220/359.4 |
| 2012/0043324 A1 * | 2/2012 | Baker | ................. | B65D 17/502 220/276 |
| 2012/0193360 A1 * | 8/2012 | Deltour | ................ | B65D 17/502 220/260 |

FOREIGN PATENT DOCUMENTS

| | | |
|---|---|---|
| JP | 4-87963 A | 3/1992 |
| JP | 4-104435 U | 9/1992 |
| JP | 10-305871 A | 11/1998 |

OTHER PUBLICATIONS

International Search Report for PCT/JP2018/045134 dated Feb. 12, 2019.
Written Opinion of the International Searching Authority for PCT/JP2018/045134 (PCT/ISA/237) dated Feb. 12, 2019.

* cited by examiner

HEAT SEALED LID AND CAN

TECHNICAL FIELD OF THE INVENTION

The present invention relates to a heat sealed lid and a can.

Priority is claimed on Japanese Patent Application No. 2017-234894, filed on Dec. 7, 2017, the content of which is incorporated herein by reference.

RELATED ART

At present, most food cans are mainly easy-open-end (EOE) cans that do not require can openers. However, when a can lid is cut off along a scored groove while the EOE tab is raised and pulled upward from the can, a considerable force is necessary. On the other hand, an end surface of an opened lid and an end surface remaining on the can side after EOE peeling are likely to cause a cut. For these reasons, in recent years, as pet food cans, tuna cans, and the like, there is an increasing number of heat sealed lid cans that employ a heat sealed lid characterized by easy openability which is used as a lid by subjecting a resin laminate aluminum foil to thermal fusion-bonding (hereinafter, heat sealing).

The heat sealed lid is a lid in which a frame part seamed with the can is made of a coated metal sheet or a resin laminate metal sheet, the center portion of the frame has an opening part for taking out contents, and a resin laminate aluminum foil laminated with a thermoplastic resin is fused to the frame portion. By using the soft thermoplastic resin (for example, polyethylene (PE) or polypropylene (PP)) as the resin laminated on the resin laminate aluminum foil, the resin laminate aluminum foil can be easily peeled off by holding a gripping portion of the end thereof, and can opening is easier than the EOE.

However, when the sealing strength of a part where the frame part seamed with the can and the resin laminate aluminum foil are fused together is not stable, there is concern that the contents may leak in a retort sterilization process. Therefore, it is important that the sealing strength is stable.

As shown in FIG. 8, in a current heat sealed lid structure, a heat sealed surface 8 on a substrate side, which is to be a seamed portion, is mainly coated, but the layer structure has multiple layers and requires a plurality of coating and baking processes. Therefore, there is a disadvantage that the manufacturing cost is high.

In addition, bisphenol A (BPA), which is the main raw material of a can coating in the related art, is an environmental hormone substance, so that BPA-free type coatings are now being used. However, BPA-free coatings have low adhesion to steel sheets and low corrosion resistance and still have many problems, and a substrate that does not contain an environmental hormone substance is also desired for the heat sealed lid.

For the above reasons, the inventors examined the application of a polyester-based resin film laminate metal sheet, which is being used for the body material and lid material of food cans, to a side frame substrate as a measure for process simplification, cost reduction, and environmental hormone. However, in the resin film laminate metal sheet laminated with the normal polyester-based resin film, since the melting point of the film is around 250° C., insufficient adhesion was caused under normal heat sealing conditions (pressure-bonding at 160° C. to 200° C. for about 1 second to several seconds) and a sufficient heat sealing strength was not obtained. For this reason, due to an increase in internal pressure during a retort sterilization treatment of the can, a heat sealed portion was peeled off and the contents leaked in some cases, so that the application thereof was difficult.

Since the resin of the resin laminate aluminum foil forming the heat sealed lid is thermoplastic, such as a polyolefin-based resin, the resins of both the resin laminate aluminum foil and the substrate on the heat sealing side are desirably the same kind of thermoplastic resin having a low softening and melting temperature so that the resins are easily fused together. However, a polypropylene-based resin and the like that are inexpensive and have high sealing strength even at a retort temperature are difficult to dissolve in a solvent, and thus cannot be used as a raw material for a coating on the heat sealed surface on the substrate side.

In the case of a heat sealed lid in which the substrate is a coated metal sheet, a thermosetting resin on the coated surface does not melt during heat sealing. Therefore, if the time for heat-sealing the resin laminate aluminum foil is not lengthened, the strength variation of the heat sealed portion becomes large, so that there is a disadvantage that the productivity of the heat sealed lid is low.

On the other hand, the inventors examined the application of a polypropylene-based resin film laminate metal sheet using a thermoplastic phthalic anhydride-modified polypropylene resin having a high surface activity as the substrate side of the heat sealed lid. In the case of the metal sheet, the modified polypropylene resin is fused to the surface of a laminating roll during heat sealing. For this reason, in a current method for manufacturing a resin film laminate metal sheet, it is difficult to manufacture a heat sealed lid using the polypropylene-based resin film laminate metal sheet.

Patent Document 1 discloses an easy open lid in which a resin used for a lid to be heat sealed and a resin used for a container are polypropylene. However, the easy open lid disclosed in Patent Document 1 has a problem that a heat sealed portion is likely to vary in the fused state in a case where heat sealing is performed within a short period of time.

PRIOR ART DOCUMENT

Patent Document

[Patent Document 1] Japanese Unexamined Patent Application, First Publication No. H10-305871

DISCLOSURE OF THE INVENTION

Problems to be Solved by the Invention

The present invention provides a heat sealed lid and a can in which heat sealability is excellent, an existing commercially available product can be used as a resin laminate aluminum foil, productivity is excellent, and a film in a resin film laminate metal sheet used for a frame substrate of the lid is not fused to a laminating roll during manufacturing and thus cause excellent productivity and surface quality.

Means for Solving the Problem

In order to solve the above-mentioned issues and problems, examination was conducted so that a material used in the related art is used as a resin laminate aluminum foil used for a heat sealed lid, and a resin film laminate metal sheet is used for a frame substrate of the lid. If a film in the resin film laminate metal sheet on the content side melts in a case of being brought into contact with a heat sealing tool, there is concern that the resin film may be damaged and the corrosion resistance may be impaired. Therefore, it is preferable that the melting point of the resin film of the resin film laminate metal sheet on the side (can inner surface side) opposite to the heat sealing side is higher than the heating temperature of the heat sealing tool. For this reason, the present inventors found that it is preferable that the resin film of the resin film laminate metal sheet on the side opposite to the heat sealing side has a melting point higher than that of a polypropylene-based resin on the heat sealing side by 40° C. or more, and a polyester-based resin film with high performance from the viewpoint of food hygiene is particularly preferable.

The present invention has been made based on the above findings, and the gist thereof is as follows.

(1) A heat sealed lid according to an aspect of the present invention includes: a resin laminate aluminum foil having an aluminum foil and a first resin film covering one surface of the aluminum foil; and a resin film laminate metal sheet, in which the resin film laminate metal sheet includes a first contact region in contact with the first resin film, a first seamed side frame portion on one end side of the first contact region, and a second seamed side frame portion on the other end side of the first contact region, the resin film laminate metal sheet in the first contact region includes a second resin film containing a thermoplastic polyester resin, a metal sheet covering one surface of the second resin film, and a laminate film covering one surface of the metal sheet, the laminate film includes a base layer which contains a modified polypropylene-based resin and is in contact with the metal sheet, and an adhesion layer which is formed on one side of the base layer and is in contact with the other surface side of the first resin film, the adhesion layer contains a first polypropylene-based resin and a polyethylene-based resin, the amount of the polyethylene-based resin in the adhesion layer is 1.0 mass % or more and 45.0 mass % or less of the total resin amount in the adhesion layer, the melting point of the second resin film is higher than the melting point of the adhesion layer by 40° C. or more and is higher than the heating temperature of a heat sealing tool used for bonding the resin laminate aluminum foil and the first seamed side frame portion, a thickness of the adhesion layer is 1.0 μm or more and 15.0 μm or less, the thickness of the base layer is 1.0 μm or more and 18.0 μm or less, and the second seamed side frame portion has a second contact region in which the first resin film and the second resin film are in contact with each other.

(2) The heat sealed lid according to (1) may further include one or more intermediate layers between the adhesion layer and the base layer.

(3) In the heat sealed lid according to (2), the intermediate layer may contain a second polypropylene-based resin.

(4) A can according to another aspect of the present invention uses the heat sealed lid according to any one of (1) to (3).

Effects of the Invention

As described above, the heat sealed lid and the can according to the aspects of the present invention are excellent in heat sealability, can use an existing commercially available product as the resin laminate aluminum foil, and are thus excellent in productivity and surface quality without reducing productivity and fusing the film of the resin film laminate metal sheet as a frame substrate of the lid to a laminating roll during the manufacturing thereof, thereby being extremely useful.

EMBODIMENTS OF THE INVENTION

Figure 1A:
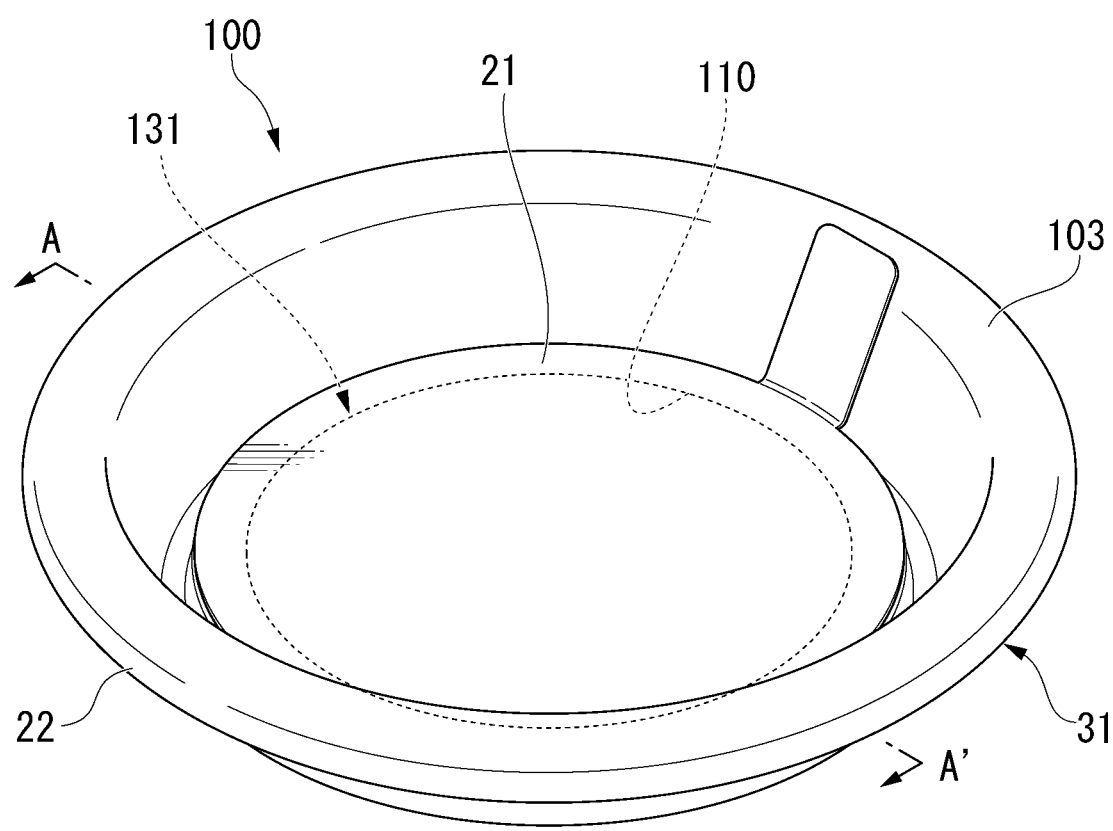
FIG. 1A is a perspective view of a heat sealed lid according to an embodiment of the present invention.

A heat sealed lid 100 according to an aspect of the present invention includes: a resin laminate aluminum foil (sometimes referred to as a resin laminate aluminum foil for a lid) 21 having an aluminum foil 1 and a first resin film 2 covering one surface of the aluminum foil; and a resin film laminate metal sheet 22, in which the resin film laminate metal sheet 22 includes a first contact region in contact with the first resin film 2, a first seamed side frame portion 31 on one end side of the first contact region, and a second seamed side frame portion 131 on the other end side of the first contact region, the resin film laminate metal sheet 22 in the first contact region includes a second resin film 7 containing a thermoplastic polyester resin, a metal sheet 6 covering one surface of the second resin film 7, and a laminate film 13 covering one surface of the metal sheet 6, the laminate film 13 includes a base layer 4 which contains a modified polypropylene-based resin and is in contact with the metal sheet 6, and an adhesion layer 3 which is formed on one side of the base layer 4 and is in contact with the other surface side of the first resin film 2, the adhesion layer 3 contains a first polypropylene-based resin and a polyethylene-based resin, the amount of the polyethylene-based resin in the adhesion layer is 1.0 mass % or more and 45.0 mass % or less of the total resin amount in the adhesion layer 3, the melting point of the second resin film is higher than the melting point of the adhesion layer 3 by 40° C. or more and is higher than a heating temperature of a heat sealing tool used for bonding the resin laminate aluminum foil 21 and the first seamed side frame portion 31, the thickness of the adhesion layer 3 is 1.0 µm or more and 15.0 µm or less, the thickness of the base layer 4 is 1.0 µm or more and 18.0 µm or less, and the second seamed side frame portion 131 has a second contact region in which the first resin film 2 and the second resin film 7 are in contact with each other.

That is, in the heat sealed lid 100 according to an aspect of the present invention, in the heat sealed lid 100 constituted by the resin laminate aluminum foil 21 for a lid and the seamed side frame substrate 31 formed of the resin film laminate metal sheet 22, the resin film 13 of the resin film laminate metal sheet 22 on a heat sealing side has the polyethylene-based resin-added polypropylene-based resin layer (adhesion layer 3) as a surface layer on a side being in contact with the resin laminate aluminum foil for a lid, the addition ratio of the polyethylene-based resin to the polyethylene-based resin-added polypropylene-based resin layer is in a range of 1.0 mass % or more and 45.0 mass % or less, the metal sheet side of the resin film laminate steel sheet 22 forming the side frame of the heat sealed lid 100 is the modified polypropylene-based resin layer (base layer) 4, the thickness of the polyethylene-based resin-added polypropylene-based resin layer (adhesion layer) 3 is 1.0 µm or more and 15.0 µm or less, the thickness of the modified polypropylene-based resin layer (base layer) 4 is 1.0 µm or more and 18.0 µm or less, the film (second resin film) 7 of the resin film laminate metal sheet 22 on the content side is the thermoplastic polyester resin having a melting point higher than that of the polyethylene-based resin-added polypropylene-based resin of the surface layer on the heat sealing side by 40° C. or more and higher than the heating temperature of the heat sealing tool.

Figure 1B:
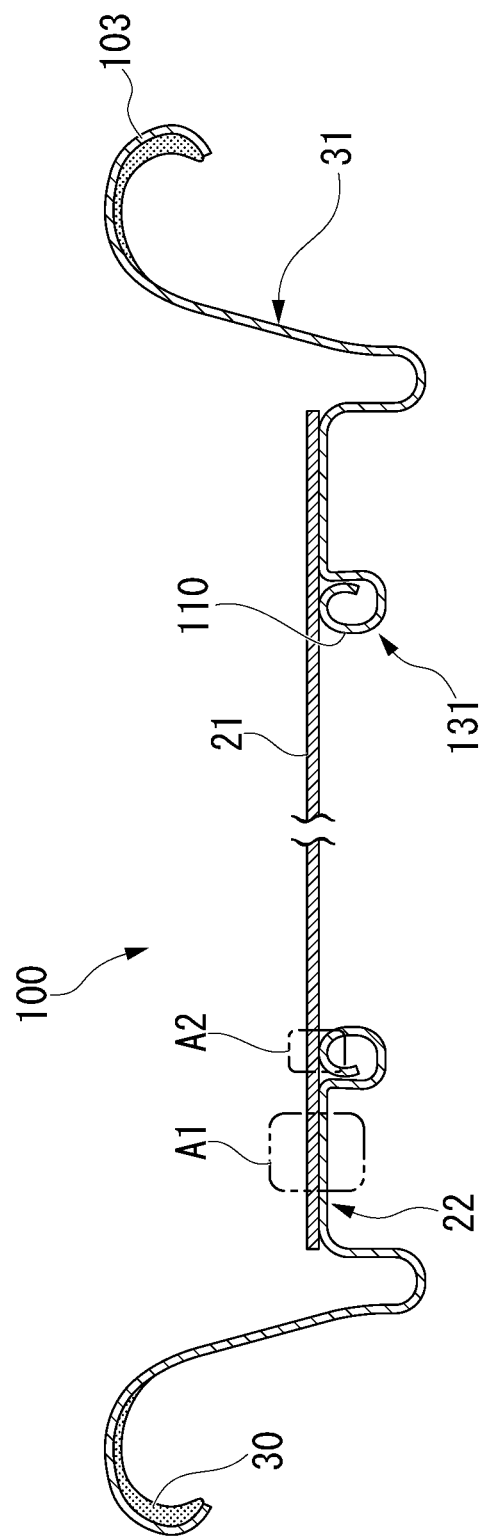
FIG. 1B is a sectional view taken along the line A-A' of the heat sealed lid according to the embodiment of the present invention.
Figure 1C:
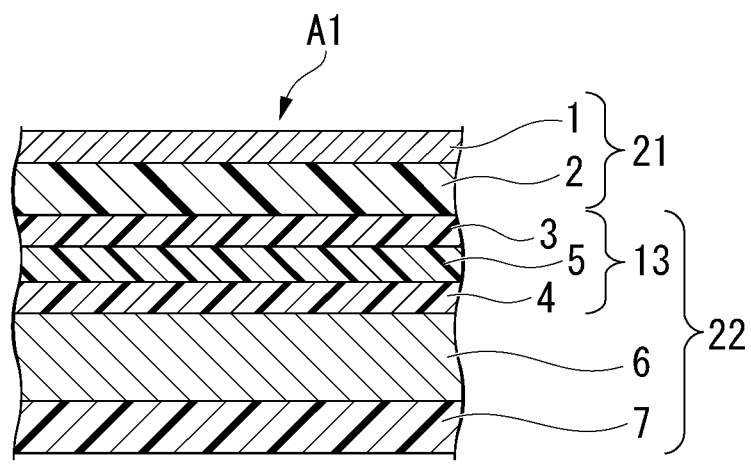
FIG. 1C is an enlarged schematic view of a first contact region A1 in the sectional view taken along the line A-A' of the heat sealed lid according to the embodiment of the present invention.
Figure 1D:
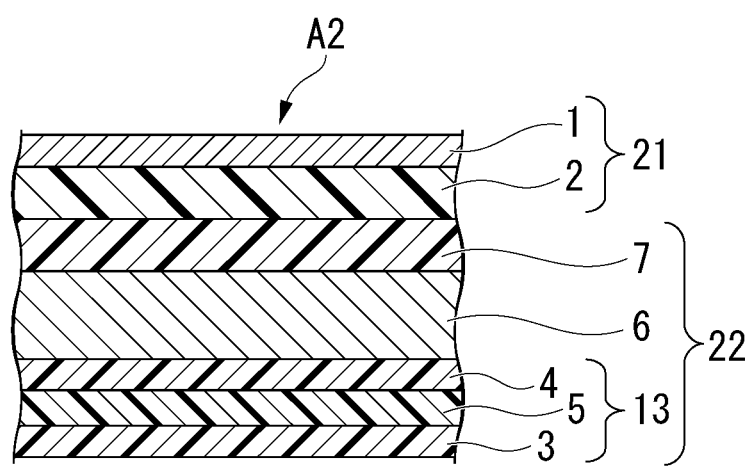
FIG. 1D is an enlarged schematic view of a second contact region A2 in the sectional view taken along the line A-A' of the heat sealed lid according to the embodiment of the present invention.

Hereinafter, the heat sealed lid 100 according to the present embodiment will be described with reference to the drawings. FIG. 1A is a perspective view of the heat sealed lid 100 according to the present embodiment. FIG. 1B is a sectional view of the heat sealed lid 100 taken along the line A-A'. FIG. 1C is an enlarged schematic view of a first contact region A1 in the sectional view taken along the line A-A' for describing the configuration of the resin film laminate metal sheet 22. FIG. 1D is an enlarged schematic view of a second contact region A2 in the sectional view taken along the line A-A' of the heat sealed lid 100 according to the embodiment of the present invention.

In addition, the first contact region A1 in the present embodiment is a region where the resin laminate aluminum foil 21 and the resin film laminate metal sheet 22 are brought into contact and heat sealed by a heat sealing process. Specifically, this is a region where the first resin film 2 of the resin laminate aluminum foil 21 is in contact with the second resin film 7 of the resin film laminate metal sheet 22. The second contact region A2 is a region where the resin laminate aluminum foil 21 and the second seamed side frame portion 131, which will be described later, are in contact with each other.

As shown in FIG. 1A, the heat sealed lid 100 includes the resin laminate aluminum foil 21 and a resin film laminate metal sheet 22. The resin film laminate metal sheet 22 is recessed in a concave shape and has an opening part 110 at the center thereof. As shown in FIG. 1B, a region between the outer edge portion of the resin film laminate metal sheet 22 and the first contact region A1 forms the first seamed side frame portion 31. The first seamed side frame portion 31 is a part seamed with the upper edge of a can body 101, which will be described later. A part at the inner side than the outer edge portion of the first seamed side frame portion 31 is curled toward the inner side of a can body 200, which will be described later, and constitutes a curled portion 103. By seaming the curled portion 103 of the first seamed side frame portion 31 and the can body 101, the heat sealed lid 100 and the can body 101 are integrated into the can body 200. The heat sealed lid 100 may include a compound 30 in the curled portion 103 for the purpose of increasing the airtightness of the can body 200. Examples of the compound 30 include styrene-butadiene rubber.

Moreover, the edge portion of the resin film laminate metal sheet 22 on the opening part 110 side is seamed to form the second seamed side frame portion 131. Details of the configuration of the second seamed side frame portion 131 will be described later for convenience of description.

As shown in FIG. 1C, in the heat sealed lid 100 in the first contact region A1, the resin laminate aluminum foil 21 is superposed on the resin film laminate metal sheet 22. The resin laminate aluminum foil 21 includes the aluminum foil 1 and the first resin film 2. The first resin film 2 covers the lower surface side of the aluminum foil 1. In the following, for the sake of convenience, the upper surface or the upper side in the drawing may be referred to as one surface side or one side, and the lower surface or the lower side in the drawing may be referred to as the other surface side or the other side. The resin film laminate metal sheet 22 includes the laminate film 13, the metal sheet 6, and the second resin film 7. The laminate film 13 includes the adhesion layer 3, the intermediate layer 5, and the base layer 4. Hereinafter, each configuration of the heat sealed lid 100 will be described.

<Resin Laminate Aluminum Foil 21>

The resin laminate aluminum foil 21 according to the present embodiment includes the aluminum foil 1 and the first resin film 2. The resin laminate aluminum foil 21 may be a commercially available resin laminate aluminum foil obtained by laminating a thermoplastic resin to an aluminum foil as in the related art. As the aluminum foil, a known aluminum foil can be used. The first resin film 2 is not particularly limited as long as it is a resin film that can be heat sealed (bonded) to the first polypropylene-based resin used in the resin film laminate metal sheet 22. As the resin used in the first resin film 2, a thermoplastic resin polyolefin-based resin such as a polypropylene-based resin can be employed. As the polypropylene-based resin, a propylene homopolymer, an ethylene-propylene block copolymer, and an ethylene-propylene random copolymer can be employed.

<Resin Film Laminate Metal Sheet 22>

As shown in FIG. 1C, the resin film laminate metal sheet 22 in the first contact region A1 includes the second resin film 7 containing the thermoplastic polyester resin, and the metal sheet 6 covering one surface of the second resin film 7, and the laminate film 13 covering one surface of the metal sheet 6.

The second resin film 7 is a film provided to prevent the metal sheet 6 of the resin film laminate metal sheet 22 from being corroded by the contents of the can. The second resin film 7 contains the thermoplastic polyester resin. The detailed configuration of the second resin film 7 will be described later for convenience of description.

<Metal Sheet 6>

As shown in FIG. 1C, the base metal of the resin film laminate metal sheet 22 is made of the metal sheet 6. The metal sheet 6 covers one surface of the second resin film 7. The metal sheet 6 may be any of a tin-coated steel sheet, a tin-free steel sheet, a cold-rolled steel sheet, a stainless steel sheet, an aluminum sheet, a titanium sheet, and the like, and is not particularly limited. However, from the viewpoint of food hygiene, workability, corrosion resistance, film adhesion, and material price, a tin-coated steel sheet or a tin-free steel sheet is suitable.

The sheet thickness of the metal sheet 6 is not particularly limited. However, a too small thickness causes deterioration of workability and is thus not preferable. On the other hand, a too large thickness is not economical, causes a difficulty in seaming the lid, and is thus not preferable. Therefore, from these viewpoints, the thickness of the metal sheet 6 is preferably 0.12 mm or more and 0.40 mm or less.

The surface roughness of the metal sheet 6 is not particularly limited. However, in a case where the surface roughness of the metal sheet 6 is less than 0.05 μm in terms of arithmetic average roughness Ra specified in JIS B 0601, if bubbles infiltrate between the metal sheet 6 and the resin film (the second resin film 7 or the laminate film 13) when the resin film (the second resin film 7 or the laminate film 13) is laminated on the metal sheet 6 by pressure bonding, the bubbles are difficult to escape. On the other hand, in a case where the surface roughness of the metal sheet 6 exceeds 0.8 μm in terms of average roughness Ra, bubbles are likely to be entrained along the convex-concave portions of the surface of the metal sheet 6 when the second resin film 7 or the laminate film 13 is laminated on the metal sheet 6 by pressure bonding. Therefore, the surface roughness of the metal sheet 6 is preferably in a range of 0.05 μm or more and 0.8 μm or less in terms of average roughness Ra. More preferably, the surface roughness thereof is 0.1 μm or more and 0.6 μm or less.

The surface of the metal sheet 6 may be subjected to a surface treatment. For example, for the purpose of improving the adhesion between the metal sheet 6 and the polyester-based film layer (the second resin film) 7, a chemical treatment film (not shown) formed of one or more elements selected from Cr, Zr, Al, Si, P, Ti, Ce, and W, and also O and unavoidable elements may be formed on the surface of the metal sheet 6. The chemical treatment film formed of hydroxides and oxides of the above elements has hydroxyl groups and thus forms hydrogen bonds with the hydroxyl groups of the polyester resin. Therefore, the adhesion between the metal sheet 6 and the polyester-based film (the second resin film) 7 is improved. In addition, the adhesion between the metal sheet 6 and the laminate film 13 including the modified polypropylene-based resin is also improved.

As a method for forming the chemical treatment film described above, a method of subjecting the metal sheet 6 to an electrolytic treatment in an aqueous solution of fluoride, nitrate, sulfate, chloride, acetate, formate, carbonate, and the like of various elements, a method using an etching reaction by immersion, and the like can be employed. After the chemical treatment, the metal sheet 6 is washed with water or hot water to remove most of the counter ion species of the above elements from the chemical treatment film. However, there are cases where a trace amount of the counter ion species remain as unavoidable elements. The counter ion species as the unavoidable elements may be present as long as the properties of the chemical treatment film are not affected.

The metal sheet 6 may have a film (not shown) formed by a silane coupling agent treatment or the like in addition to the chemical treatment film. The film formed by the silane coupling agent treatment contains a Si compound, has excellent adhesion to the metal sheet 6 and the polyester resin used in the second resin film 7, and is thus preferable.

<Laminate Film 13>

The laminate film 13 has at least the base layer 4 and the adhesion layer 3. The base layer 4 is a layer containing the modified polypropylene-based resin, and is provided so as to cover the upper surface (one surface) of the metal sheet 6 as shown in FIG. 1C. The adhesion layer 3 is formed on the upper side (one side) of the base layer 4. The adhesion layer 3 is a layer that becomes the outermost surface of the resin film laminate metal sheet 22. The adhesion layer 3 is in contact with the lower surface (the other surface) of the first resin film 2 of the resin laminate aluminum foil 21 for a lid in the first contact region A1. The intermediate layer 5 may be formed between the base layer 4 and the adhesion layer 3.

<Base Layer 4>

The reason why the base layer 4 contains the modified polypropylene-based resin will be described below. The resin of the first resin film 2 of the resin laminate aluminum foil 21 for a lid is the thermoplastic resin polyolefin-based resin having a low softening and melting temperature as described above, such as a polypropylene-based resin. In a case where the resin film laminate metal sheet 22 shown in FIG. 1B is a metal sheet without a resin coating, even if the heat sealed lid 100 is directly heat sealed to the metal sheet, the adhesion between the heat sealed lid 100 and the metal sheet is very poor. For this reason, it is necessary to form the resin film laminate metal sheet 22 laminated with the resin for the metal sheet 6 in the present embodiment so as to improve the heat sealability with the first resin film 2 containing the thermoplastic polyolefin-based resin. Therefore, it is preferable to use a polypropylene-based resin as the resin of the resin film laminate metal sheet 22.

On the other hand, thermoplastic polyolefin-based resins such as the aforementioned polypropylene-based resin do not have polar groups such as hydroxyl groups and carboxyl groups in the molecular chain. For this reason, the resins have a low surface activity, and even when a polypropylene-based resin film is to be laminated on a metal sheet which is the base metal on a resin laminate metal sheet side, for example, a metal sheet having excellent coating adhesion such as a tin-free steel sheet, hydrogen bonds cannot be generated with the hydrated oxide of a surface chemical treatment layer of the metal sheet. Therefore, the adhesion between the polypropylene-based resin film and the metal sheet is very poor, and a resin film laminate metal sheet cannot be formed.

Accordingly, in the polypropylene-based resin film of the laminate film 13, a modified polypropylene-based resin layer is generally used as the base layer 4 on the side that is in close contact with the metal sheet 6. Here, the modified polypropylene-based resin layer (film) refers to a resin layer which is improved in adhesion by modifying a polypropylene-based resin with phthalic anhydride or the like and thus enhancing the surface activity. Examples of the modified polypropylene-based resin include maleic anhydride-modified polypropylene. Depending on the purpose, the base layer 4 may further contain an additive such as an antioxidant in addition to the modified polypropylene-based resin.

However, when the resin film laminate metal sheet 22 is manufactured, if a modified polypropylene-based resin-based layer is formed on the surface of the resin film laminate metal sheet 22 (the surface of the adhesion layer 3), the modified polypropylene-based resin is fused to the surface of a laminating roll. For this reason, defects, such as peeling, are likely to occur on the film surface of the resin film laminate metal sheet 22, which is not preferable. Therefore, the adhesion layer 3 is made of an unmodified polypropylene-based resin layer to avoid the fusion of the resin to the laminating roll. That is, the polypropylene-based resin contained in the adhesion layer 3 is preferably an unmodified polypropylene-based resin that is not acid-modified. As the first polypropylene-based resin, a propylene homopolymer, an ethylene-propylene block copolymer, and an ethylene-propylene random copolymer can be employed. Depending on the purpose, the adhesion layer 3 may further contain an additive such as an antioxidant in addition to the polypropylene-based resin.

The reason why the modified polypropylene-based resin layer is easily fused to the surface of the laminating roll is considered as follows. The laminating roll is made of fluoro rubber, natural rubber, or the like, and in the laminating roll that has been continuously used for a long time at a surface temperature between 80° C. and 120° C., the natural rubber (primarily containing isoprene) is thermally deteriorated and oxidized functional groups are generated. For this reason, the laminating roll is in a state having a high surface activity, and it is considered that when a resin having a high surface activity, such as a modified polypropylene-based resin layer, is pressed against the roll in a melted state, the modified polypropylene-based resin is likely to be bonded to the oxidized functional groups of the thermally deteriorated natural rubber.

However, in a case where the surface layer of the laminate film 13 which is a material for the first seamed side frame portion 31 and the second seamed side frame portion 131 for the heat sealed lid 100 is an unmodified polypropylene-based resin, although the fusion to the laminating roll is avoided, the effect of improving the adhesion by the modified resin cannot be obtained. Therefore, in a case where the first seamed side frame portion 31 and the resin laminate aluminum foil 21 are heat sealed within a short period of time, the fused state of the heat sealed portion tends to vary. For this reason, the can body in which food contents are put and the lid is seamed is liable to cause the contents to leak from portions where the fused state of the heat sealed portion is poor during a retort sterilization treatment, which is not preferable. If the time for heat sealing between the resin laminate aluminum foil 21 and the first seamed side frame portion 31 is increased, the fused state of the heat sealed portion is stabilized, but the productivity of the lid is deteriorated, which is not preferable.

Therefore, a polyethylene-based resin having a lower melting point than the polypropylene-based resin is added to the adhesion layer 3 on the side to be heat sealed with the resin laminate aluminum foil 21. Accordingly, the melting of the film surface starts at a lower temperature during heat sealing, so that the heat sealability is improved. Here, examples of the polyethylene-based resin include low-density polyethylene, high-density polyethylene, and linear low-density polyethylene.

<Intermediate Layer 5>

One or a plurality of intermediate resin layers (intermediate layers) 5 may be formed between the base layer 4 and the adhesion layer 3 as necessary. Examples of the intermediate resin layer (intermediate layer) 5 include a multilayer resin of a polypropylene-based resin (second polypropylene-based resin) and an ionomer (HIMILAN made by DuPont-Mitsui Polychemicals Co., Ltd.), and a single layer resin other than polypropylene-based resins, such as a methylpentene polymer (TPX manufactured by Mitsui Chemicals) and an ionomer (HIMILAN made by DuPont-Mitsui Polychemicals Co., Ltd.). Depending on the purpose, the intermediate layer 5 may contain an additive such as an antioxidant in addition to these resins. In view of production of the resin film layer and adhesion of each layer, the intermediate layer 5 is more preferably a polypropylene-based resin layer, and the polyethylene-based resin-added polypropylene-based resin layer (adhesion layer) 3 as the surface layer on the heat sealing side/the polypropylene-based resin layer (intermediate layer) 5/the modified polypropylene-based resin layer (base layer) 4 is preferable.

Although the total thickness of the laminate film 13 forming the first seamed side frame portion 31 and the second seamed side frame portion 131 is not particularly specified, and is assumed to be about 5 to 80 μm in view of a heat sealed lid 100 and a resin film laminate metal sheet 22 that are currently manufactured, but is not limited thereto.

<Details of Second Resin Film 7>

The second resin film 7 of the present embodiment is positioned on the inner surface side of the can body 200 when the can body 101 and the heat sealed lid 100 are seamed. If the second resin film 7 melts when the heat sealing tool used to bond the resin laminate aluminum foil 21 and the resin film laminate metal sheet 22 comes into contact the second resin film 7, there is concern that the resin film may be damaged and the corrosion resistance of the heat sealed lid 100 may be impaired. Therefore, the melting point of the second resin film 7 is preferably higher than the heating temperature of the heat sealing tool. For this reason, the melting point of the second resin film 7 is preferably higher than the melting point of the adhesion layer 3 by 40° C. or more. As the second resin film 7, a polyester-based resin film is preferable particularly because of excellent workability, adhesion, corrosion resistance, hygiene, and flavor retention. The melting point of the second resin film 7 is preferably 200° C. or higher and 300° C. or lower from the viewpoint of productivity. The melting points of the adhesion layer 3 and the second resin film 7 are the temperatures of the main endothermic peak obtained by differential scanning calorimetry.

Hereinafter, the details of the second resin film 7 will be described.

The second resin film 7 may be a stretched film or an unstretched film, and is not particularly limited. However, a stretched film is superior in corrosion resistance and strength to an unstretched film, is less expensive than an unstretched film, and is thus more preferable.

Examples of the resin forming the second resin film 7 include a copolymer polyester mainly containing ethylene terephthalate units and containing, in addition to the ethylene terephthalate units, ethylene isophthalate units or butylene terephthalate units as a copolymer component, and a mixture of polyethylene terephthalate and a polyethylene terephthalate-isophthalate copolymer or a polyethylene terephthalate-butylene terephthalate copolymer.

Regarding the ratio between the ethylene terephthalate units and the ethylene isophthalate units, it is preferable that the ethylene isophthalate units occupy 12 mol % or less of the entire polyester-based film. In a case where the ratio of the polyethylene isophthalate units to the polyester-based film exceeds 12 mol %, the crystallinity of an oriented crystal layer decreases, so that there are cases where the moisture permeability of the film increases and the corrosion resistance decreases.

The second resin film 7 may be a single layer or a multilayer structure of two layers or three layers. In the case of a multilayer structure, the kinds of resins of the layers may be different.

The thickness of the second resin film 7 is preferably 8 μm or more and 30 μm or less. In a case where the thickness of the second resin film 7 is less than 8 μm, the corrosion resistance is insufficient in some content, which is not preferable. On the other hand, in a case where the thickness of the second resin film 7 exceeds 30 μm, the thickness of the oriented layer is relatively thick compared to an amorphous layer fused to the metal sheet 6, so that the shrinkage force after forming and a retort treatment becomes strong, and the film may peel off.

Moreover, inorganic particles such as silica may be incorporated and dispersed in the second resin film 7 for the purpose of preventing the blocking of the film because the effect of the present invention is not impaired.

<Second Contact Region A2>

Next, details of the configuration of the second contact region A2 shown in FIG. 1B will be described. As shown in FIG. 1B, the edge portion of the resin film laminate metal sheet 22 on the opening 110 side is seamed. This seamed part is referred to as the second seamed side frame portion 131. While the first seamed side frame portion 31 is on one end side (the outer edge side in FIG. 1B) of the first contact region A1, the second seamed side frame portion 131 is provided on the other end side (the opening 110 side) of the first contact region A1.

As shown in FIG. 1B, the second seamed side frame portion 131 is in contact with the resin laminate aluminum foil 21 for a lid. The region where the second seamed side frame portion 131 and the resin laminate aluminum foil 21 for a lid are in contact with each other is referred to as the second contact region A2. Here, since the resin film laminate metal sheet 22 is seamed, the second seamed side frame portion 131 is in contact with the resin laminate aluminum foil 21 in a state where the resin film laminate metal sheet 22 is inverted in the second contact region A2.

FIG. 1D shows an enlarged sectional view of the second contact region A2. Since the resin film laminate metal sheet 22 is inverted in the second contact region A2, the second resin film 7 of the resin film laminate metal sheet 22 is in contact with the first resin film 2 of the resin laminate aluminum foil 21.

The melting point of the second resin film 7 in the present embodiment is higher than the melting point of the adhesion layer 3 by 40° C. or more. The melting point of the second resin film 7 is higher than the heat sealing temperature. For this reason, even if the adhesion layer 3 and the first resin film 2 of the resin laminate aluminum foil 21 in the first contact region A1 are fused to each other when heat sealing is performed, the first resin film 2 and the second resin film 7 in the second contact region A2 are not fused to each other.

In a case where the first resin film 2 of the resin laminate aluminum foil 21 and the second resin film 7 in the second contact region A2 are locally fused to each other, when the resin laminate aluminum foil 21 is peeled off from the heat sealed lid 100, stress concentrates on the fused portion in the second contact region A2. Therefore, there is concern that a crack or a hole originated from the fused portion in the second contact region A2 may be generated, and the resin laminate aluminum foil 21 may be damaged.

However, since the melting point of the second resin film 7 in the present embodiment is higher than the melting point of the adhesion layer 3 by 40° C. or more, portions where the first resin film 2 of the resin laminate aluminum foil 21 and the second resin film 7 are fused are not generated during heat sealing. Therefore, the resin laminate aluminum foil 21 can be prevented from being damaged when the resin laminate aluminum foil 21 is peeled off from the heat sealed lid 100.

<Method for Manufacturing Resin Film Laminate Metal Sheet>

Figure 3:
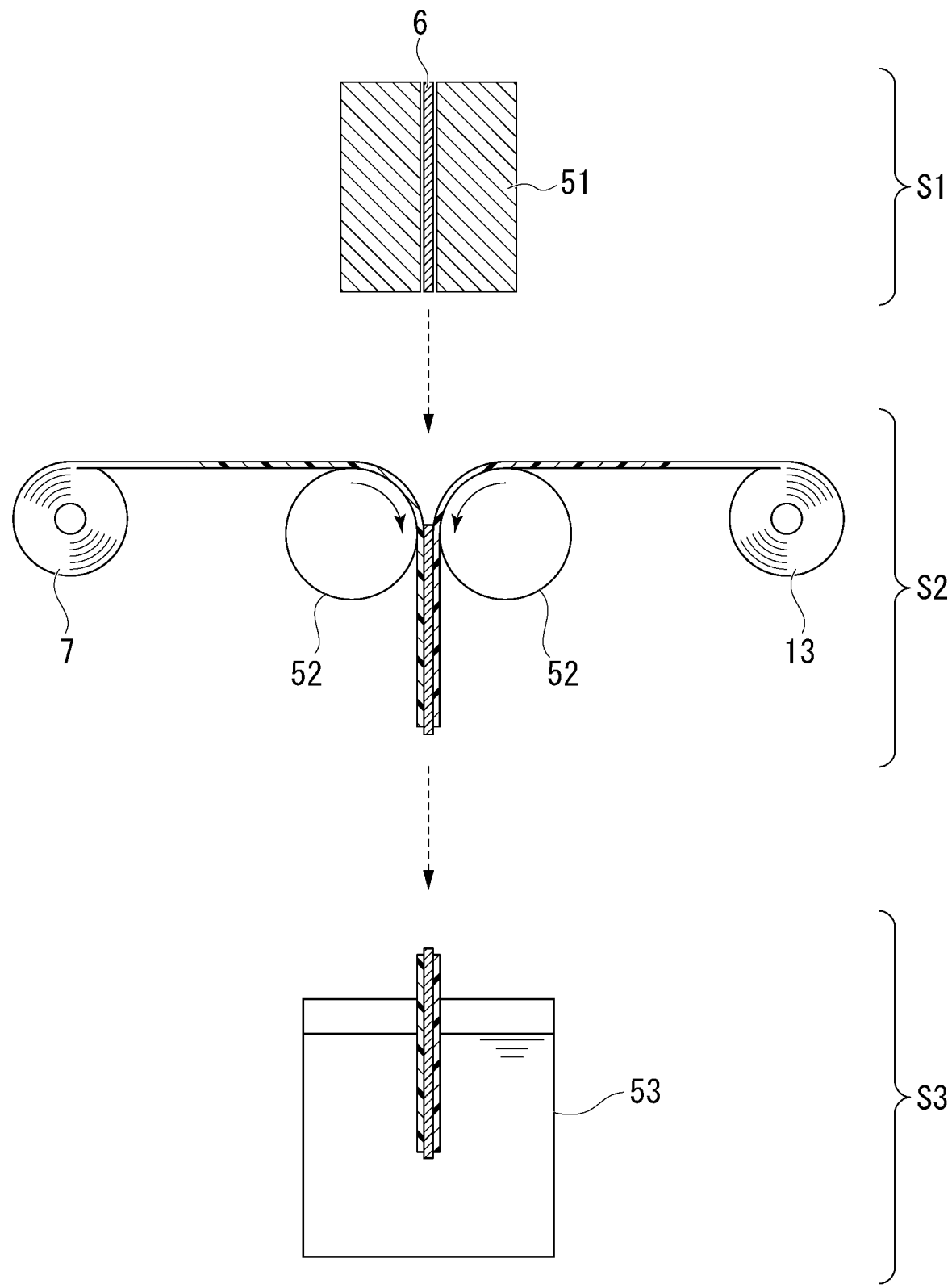
FIG. 3 is a view illustrating a configuration of a resin film laminating apparatus.

Regarding the resin film laminate metal sheet 22, a known metal sheet 6 is heated by a resin film laminating apparatus (for example, a heating roll (hot press) 51) as shown in FIG. 3 and the second resin film 7 and the laminate film 13 are respectively pressure-bonded to one surface side and the other surface side of of the known metal sheet 6 by film laminating rolls 52 to subject the second resin film 7 and the laminate film 13 to thermal fusion-bonding. Next, the resin film laminate metal sheet 22 is cooled to a predetermined temperature in a water cooling tank 53. As a result, a resin film layer structure which is uniform in the width and length directions of the resin film laminate metal sheet 22 can be formed, and bubbles entrained between the metal sheet 6 and the second resin film 7 and the laminate film 13 can be reduced.

As a method of heating the metal sheet 6 by the resin film laminating apparatus, there is a method of passing and heating the metal sheet through a jacket roll that is heated by passing a heating medium such as a plurality of steams through the roll or a heating roll having a heater embedded therein.

As the film laminating roll 52, a rubber roll is preferable because an appropriate nip length can be secured at a film laminate portion. As a material of the rubber roll, rubber having high heat resisting properties such as fluorine rubber and silicon rubber is particularly preferable.

After the second resin film 7 and the laminate film 13 are thermally fusion-bonded to the metal sheet 6 by the above method, the resin film laminate metal sheet 22 is immediately cooled to a temperature lower than the crystallization temperature of the second resin film 7 by a method such as water cooling, air-water cooling, or cold air.

<Production of Heat Sealed Lid>

The heat sealed lid 100 may be produced by the same method as forming of a frame side of a normal heat seal can lid, and the seamed side frame portion 31 and the seamed side frame portion 131 are formed so that the can inner surface side of the resin film laminate metal sheet 22 becomes the second resin film 7 and the outer surface side becomes the laminate film 13.

As the resin laminate aluminum foil 21, the above-described commercially available thermoplastic resin laminate aluminum foil for heat sealing may be used.

The heat sealing conditions for the first seamed side frame portion 31 and the resin laminate aluminum foil 21 are preferably equal to or higher than the melting point of the first resin film 2, and heat sealing may be performed by pressurization at a tool temperature of 160° C. to 220° C. for about 0.5 seconds to 1 minute. In a case where the tool temperature is lower than 160° C., the degree of fusion bonding of the heat sealed portion tends to be non-uniform, which is not preferable. Moreover, when the tool temperature exceeds 220° C., there are cases where a film surface on the inner surface side of the heat seal first seamed side frame portion 31 that comes into contact with the tool softens and causes defects, which is not preferable. When the heat sealing temperature is too high, the resin in the fused portion protrudes and the resin thickness in the seal portion becomes thin, which is not preferable.

As described above, the heat sealed lid 100 according to the present embodiment is excellent in heat sealability, can use an existing commercially available product as the resin laminate aluminum foil, and is thus excellent in productivity and surface quality without reducing productivity and fusing the film of the resin film laminate metal sheet as the frame substrate of the lid to the laminating roll during the manufacturing thereof, thereby being extremely useful.

[Polyethylene-Based Resin Addition Ratio Confirmation Test]

Next, the polyethylene-based resin addition ratio of the polyethylene-based resin-added polypropylene-based resin layer (adhesion layer) will be described below.

[Preparation of Resin Laminate Steel Sheet for Polyethylene-Based Resin Addition Ratio Confirmation Test]

As a frame side film of the heat sealed lid, in the polyolefin-based resin-based film (polyethylene-based resin-added polypropylene-based resin layer (adhesion layer, thickness 5 μm)/polypropylene-based resin layer (intermediate layer, thickness 10 μm)/modified polypropylene-based resin layer (base layer, thickness 5 μm)) produced by a three layer co-extrusion film forming machine, the polyethylene-based resin-added polypropylene-based resin layer (adhesion layer) on the heat sealed layer side is a resin (polypropylene-based resin content 40 to 100 mass %) in which low-density polyethylene (NOVATEC LL, UF230 manufactured by Japan Polyethylene Corporation) is blended with a homopolypropylene resin (NOVATEC PP, MA1B manufactured by Japan Polypropylene Corporation) to an addition ratio (content) of 0 to 60 mass %.

The film for the inner surface side of the can (second resin film) is a polyester-based resin film (thickness 17 μm) obtained by copolymerizing polyethylene terephthalate with 8 mol % of polyethylene isophthalate, and by laminating the polyolefin-based resin film (laminate film) and the polyester-based resin film (second resin film) on a chromium plated tinfree steel having a thickness of 0.2 mm at 250° C., a resin film laminate metal sheet for a heat sealed lid frame for a test was produced.

[Production of Heat Sealed Lid for Test for Polyethylene-Based Resin Addition Ratio Configuration Test]

The produced resin film laminate metal sheet for a heat sealed lid frame for a test was formed into a frame for a heat sealed lid for a test so that the can inner surface was the polyester-based resin and the outer surface side was the three-layer polyolefin-based resin, the heat sealed surfaces (the resin film and the adhesion layer) of a commercially available resin laminate aluminum foil for heat sealing (PP resin 20 μm/aluminum foil) and the produced frame for a heat sealed lid for a test were aligned, and by pressurizing a heat sealing tool heated to 180° C. from both surfaces of the heat sealed portion at a pressure of 10 N/cm² for 1 second, a heat sealed lid for a test was produced.

[Can Body Retort Test of Heat Sealed Lid for Test]

The produced heat sealed lid for a test was attached to a DRD can (body) filled with tap water up to 80% of the internal volume of the can, the lid was seamed by a can lid seaming device, thereafter the weight of the can body was measured with an electronic balance to the number of grams with one decimal place, and the resultant was subjected to a retort treatment in a retort oven at 125° C. for 30 minutes.

[Determination of Sealability of Can Body Heat Sealed Portion of Heat Sealed Lid for Test]

The weight of the can body subjected to the retort treatment was measured again with an electronic balance to the number of grams with one decimal place. In a case where the weight was reduced by 0.2 mass % or more, it was considered that liquid leakage had occurred and was regarded as being unacceptable. In a case where the weight reduction ratio was 0.05 mass % or more and less than 0.2 mass %, the weight loss was not so high that liquid leakage was determined and was determined to be acceptable. In a case where the weight reduction ratio was less than 0.05 mass %, the weight reduction ratio was within a measurement error range, so that the sealability of the heat sealed portion of the can body was determined to be good.

In addition to the method of determining the presence or absence of liquid leakage based on the weight reduction ratio of the can body after the retort treatment of the can body with the heat sealed lid seamed (can body heat sealed portion sealability determination method), by determining whether or not the T peeling strength of the heat seal test piece after retorting is stably obtained within a range of a peel length of 50 mm, the upper and lower limit amounts of the addition ratio (amount) of the polyethylene-based resin added to the polyethylene-based resin-added polypropylene-based resin layer (adhesion layer) were determined. Hereinafter, the heat sealability determination method used for the above determination will be specifically described.

[Heat Sealability Determination Method]

In general, if the peeling strength of the heat sealed portion of the can body is 10 N/cm or more, the heat sealed portion is said to have sufficient strength. It is known that if the pressure bonding time during heat sealing is increased, the peeling strength of the heat sealed portion is improved and stabilized. However, when the heat sealing time is increased, the productivity of the heat sealed lid decreases, which is not preferable. Therefore, the heat sealability was determined based on whether or not a sufficient peeling strength for the heat sealed portion could be obtained with a heat sealing time of 1 second or shorter. The details will be described below.

1) Heat seal sample production: The resin laminate aluminum foil and the resin laminate metal sheet cut to a size of 50 mm×100 mm were superposed at the heat sealed surfaces, and heated and pressure-bonded with a pressure of 10 N/cm² and a pressure bonding time of 1 second by a hot press at 180° C., whereby a heat seal sample was produced.

2) Retort treatment: The produced heat seal sample was immersed in tap water and subjected to a retort treatment at 125° C. for 30 minutes.

3) Sealing strength measurement: The sample after the retorting was cut into a width of 10 mm, and the T-type peeling strength was measured at a peeling length of 50 mm or longer to obtain a sealing strength. (tension rate 200 mm/min, measurement temperature 25° C.)

4) Heat sealability determination: Whether the heat sealability was good or not was determined based on whether or not the peeling strength was stably obtained within a peeling length range of 50 mm.

The Heat sealability was determined to be good in a case where a peeling strength of 10 N/cm or more was stably obtained within a peeling length range of 50 mm, determined to be acceptable in a case where a peeling strength of 5 N/cm or more and less than 10 N/cm was stably obtained within a peeling length range of 50 mm, and was determined to be unacceptable in a case where a part having a peeling strength of less than 5 N/cm within a peeling length range of 50 mm was revealed.

Figure 4:
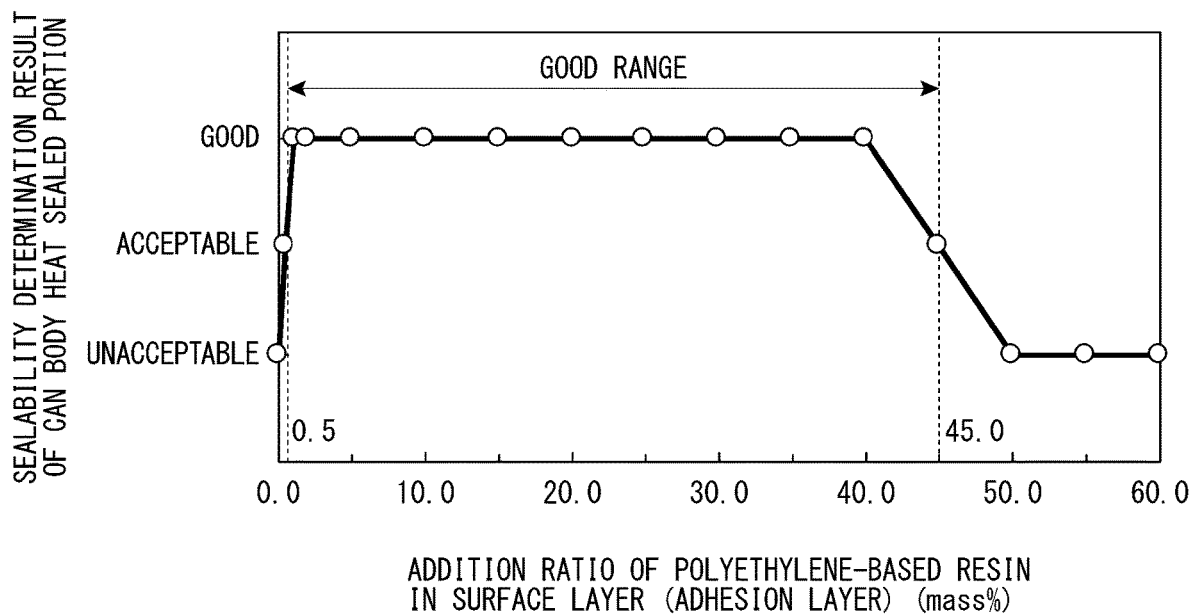
FIG. 4 is a diagram showing the relationship between the addition ratio of a polyethylene-based resin in a surface layer (adhesion layer) on a side in contact with a resin laminate aluminum foil for a lid, and the sealability of a can body heat sealed portion.
Figure 5:
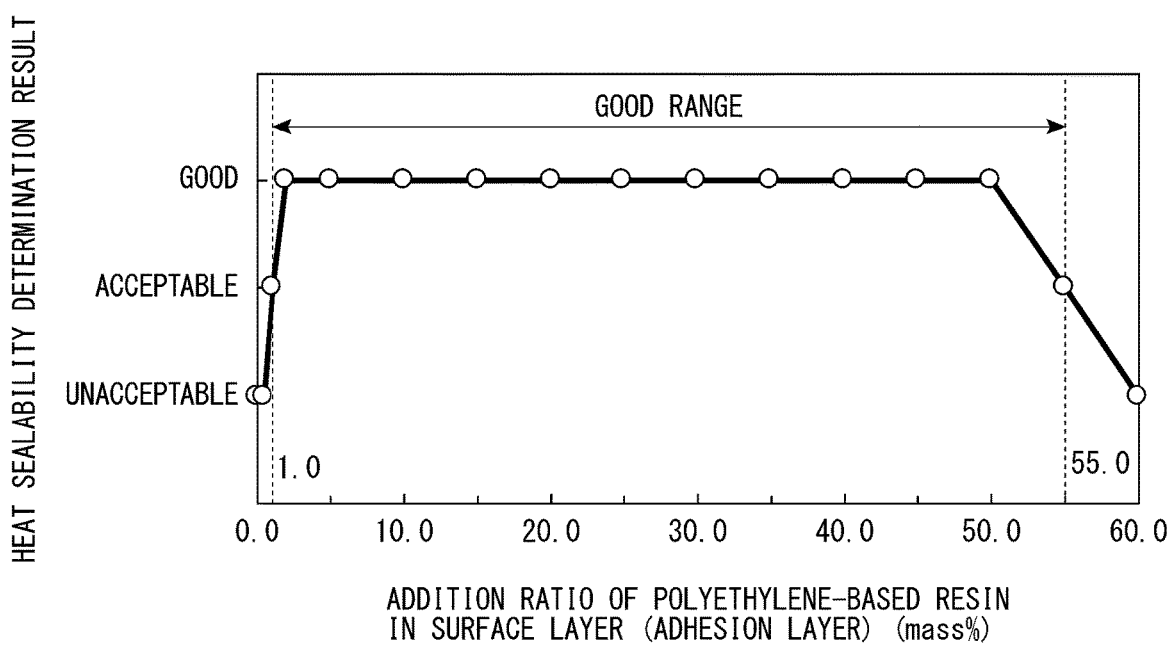
FIG. 5 is a diagram showing the relationship between the addition ratio of the polyethylene-based resin in the surface layer (adhesion layer) on the side in contact with the resin laminate aluminum foil for a lid, and heat sealability.

The test results of the range of the upper and lower limit amounts of the addition ratio (content) of the polyethylene-based resin added to the polyethylene-based resin-added polypropylene-based resin layer (adhesion layer) according to the above-described determination method are shown in FIGS. 4 and 5.

FIG. 4 is a diagram showing the addition ratio (content) of the polyethylene-based resin added to the polyethylene-based resin-added polypropylene-based resin layer (adhesion layer) on the horizontal axis, and the sealability determination result of the can body heat sealed portion on the vertical axis.

As can be seen from FIG. 4, the sealability of the can body heat sealed portion is good when the addition ratio (content) of the polyethylene-based resin added to the polyethylene-based resin-added polypropylene-based resin layer (adhesion layer) is in a range of 0.5 mass % or more and 45.0 mass % or less. In a case where the addition ratio (content) of the polyethylene-based resin is less than 0.5 mass %, the adhesion of the heat sealed portion is not stable, and liquid leakage is likely to occur, which is not preferable. Moreover, when the addition ratio (content) of the polyethylene-based resin exceeds 45.0 mass %, the softening temperature of the entire heat sealing surface is lowered, so that the heat sealed portion itself has insufficient strength at the temperature during the retorting, cannot withstand an increase in the internal pressure of the can body, and is likely to cause liquid leakage, which is not preferable.

FIG. 5 is a diagram showing the addition ratio (content) of the polyethylene-based resin added to the polyethylene-based resin-added polypropylene-based resin layer (adhesion layer) on the horizontal axis, and the heat sealability (peeling strength stability) determination result on the vertical axis.

As can be seen from FIG. 5, the heat sealability is good when the addition ratio (content) of the polyethylene-based resin added to the polyethylene-based resin-added polypropylene-based resin layer (adhesion layer) is in a range of 1.0 mass % or more and 55.0 mass % or less. In a case where the addition ratio (content) of the polyethylene-based resin is less than 1.0 mass %, the softening start temperature of the resin is high, it takes time to melt the surface of the heat sealed portion with a heat sealing time of 1 second, and adhesion is not stable with a heat sealing pressurization time of 1 second or shorter, which is not preferable. When the addition ratio (content) of the polyethylene-based resin exceeds 55.0 mass %, the softening temperature of the entire heat sealed surface is lowered, the heat sealed portion remelts and floats at the retort treatment temperature, and the peeling strength of the heat sealed portion tends to become unstable, which is not preferable.

As can be seen from the above determination results, the optimum addition ratio (content) of the polyethylene-based resin added to the polypropylene-based resin layer (adhesion layer) is 1.0 mass % or more and 45.0 mass % or less, which is a range satisfying both FIG. 4 and FIG. 5.

From the above, the film configuration of the heat sealed surface side of the resin film laminate metal sheet that forms the side frame of the heat sealed lid is the polyolefin resin-based film, at least the surface layer (adhesion layer) on the heat sealing side is the polyethylene-based resin-added polypropylene-based resin layer, the addition ratio of the polyethylene-based resin to the polyethylene-based resin-added polypropylene-based resin layer is in a range of 1.0 mass % or more and 45.0 mass % or less, and the metal sheet side (base layer) of the resin film laminate metal sheet that forms the frame side of the heat sealed lid is the modified polypropylene-based resin layer.

<Optimum Thickness of Each Layer of Laminate Film 13 of Resin Film Laminate Metal Sheet 22>

Next, in order from one side of the laminate film 13 shown in FIG. 1C, the optimum thickness range of each layer of the polyethylene-based resin-added polypropylene-based resin layer (adhesion layer) 3/the polypropylene-based resin layer (intermediate layer) 5/the modified polypropylene-based resin layer (base layer) 4 will be described. In addition, the conditions which are not described in this item were set to be the same as the above-described polyethylene-based resin addition ratio confirmation test.

Figure 6:
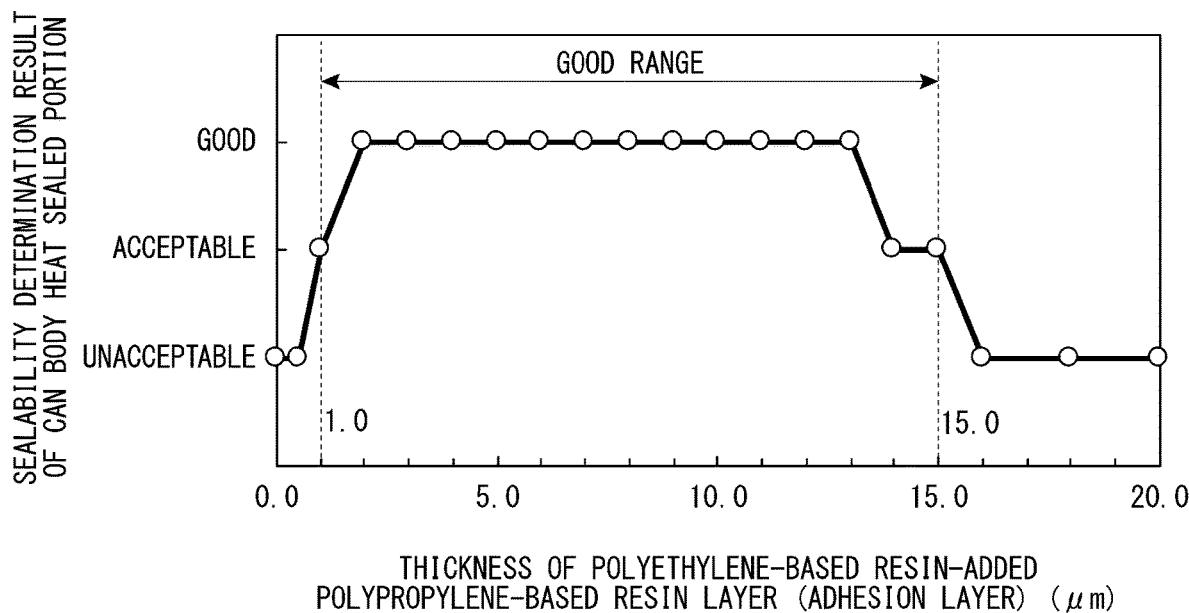
FIG. 6 is a diagram showing the relationship between the thickness of a polyethylene-based resin-added polypropylene-based resin layer (adhesion layer) and the sealability of the can body heat sealed portion.

The horizontal axis of FIG. 6 represents the thickness of the polyethylene-based resin-added polypropylene-based resin layer in the polyethylene-based resin-added polypropylene-based resin layer (adhesion layer) 3/the polypropylene-based resin layer (intermediate layer) 5/the modified polypropylene-based resin layer (base layer) 4 as the laminate film 13 of the resin film laminate metal sheet 22 in order from one side (the surface layer side on the heat sealing side), that is, the thickness of the uppermost layer on the side in contact with the resin laminate aluminum foil 21. The vertical axis of Table 6 represents the above-mentioned can body heat sealed portion sealability determination result. In the experiment of FIG. 6, the thickness of the intermediate layer 5 was 10 μm, the thickness of the base layer 4 was 5 μm, and the addition ratio (content) of the polyethylene-based resin of the adhesion layer 3 was 30 mass %.

As can be seen from FIG. 6, the sealability of the can body heat sealed portion is good when the thickness of the polyethylene-based resin-added polypropylene-based resin layer (adhesion layer) 3 is in a range of 1.0 μm or more and 15.0 μm or less. In a case where the thickness of the polyethylene-based resin-added polypropylene-based resin layer (adhesion layer 3) is less than 1.0 μm, the fusion thickness of the heat sealed portion (the fused part in the first region A1) is not sufficient, and stable heat sealing strength is not obtained with a heat sealing pressurization time of 1 second or shorter, which is not preferable. When the thickness of the polyethylene-based resin-added polypropylene-based resin layer (adhesion layer) 3 exceeds 15.0 μm, the heat sealed portion itself has insufficient strength at the temperature during the retorting, cannot withstand an increase in the internal pressure of the can body, and is likely to cause liquid leakage, which is not preferable.

Figure 7:
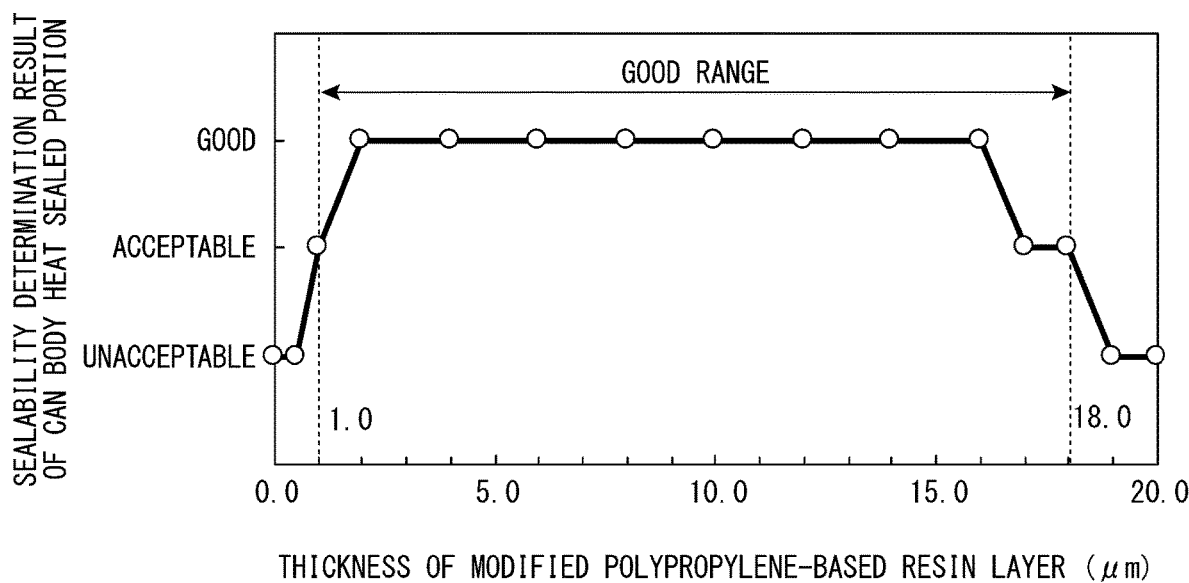
FIG. 7 is a diagram showing the relationship between the thickness of a modified polypropylene-based resin layer (base layer) and the sealability of the can body heat sealed portion.
Figure 8:
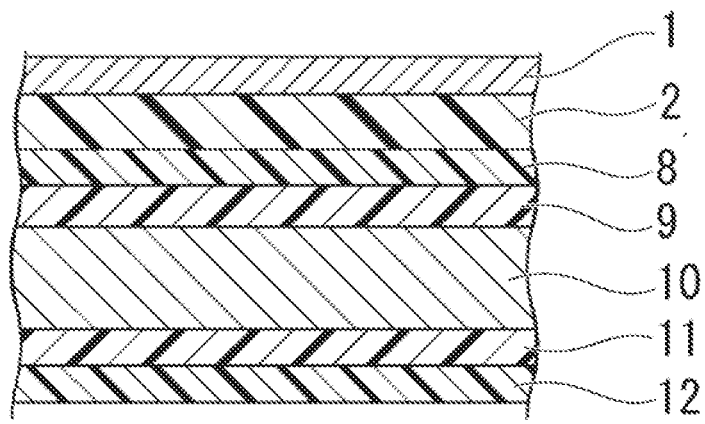
FIG. 8 is an example of a schematic sectional view of a current heat sealed lid.

The horizontal axis of FIG. 7 represents the thickness of the modified polypropylene-based resin layer 4 in the polyethylene-based resin-added polypropylene-based resin layer (adhesion layer) 3/the polypropylene-based resin layer (intermediate layer) 5/the modified polypropylene-based resin layer (base layer) 4 in order from the surface layer on the heat sealing side as the laminate film 13 of the resin film laminate metal sheet 22 forming the frame side of the heat sealed lid, that is, the thickness of the layer on the side in contact with the metal layer 6 as the base metal of the resin film laminate metal sheet. The vertical axis of FIG. 7 represents the above-mentioned can body heat sealed portion sealability determination result. In the experiment of FIG. 7, the thickness of the adhesion layer 3 was 5 mm, the thickness of the intermediate layer 5 was 10 μm, and the addition ratio (content) of the polyethylene-based resin of the adhesion layer 3 was 30 mass %.

As can be seen from FIG. 7, the thickness of the modified polypropylene-based resin (modified PP) layer (base layer) 4 is good in a range of 1.0 μm or more and 18.0 μm or less.

In a case where the thickness of the modified polypropylene-based resin layer (base layer) 4 is less than 1.0 μm, the state of close contact with the metal sheet 6 is unstable, cannot withstand an increase in the internal pressure of the can body during the retorting, and is likely to cause liquid leakage, which is not preferable.

In addition, the modified polypropylene-based resin has a lower softening temperature than the polypropylene-based resin, and the resin softens at the retorting temperature and the strength decreases. Therefore, in a case where the thickness of the modified polypropylene-based resin layer (base layer) 4 exceeds 18.0 μm, there are cases where the modified polypropylene-based resin layer (base layer) 4 is stretched due to an increase in the internal pressure of the can body during the retorting and the heat sealed portion peels off and causes liquid leakage, which is not preferable.

<Can Body (Can) 200>

Figure 2A:
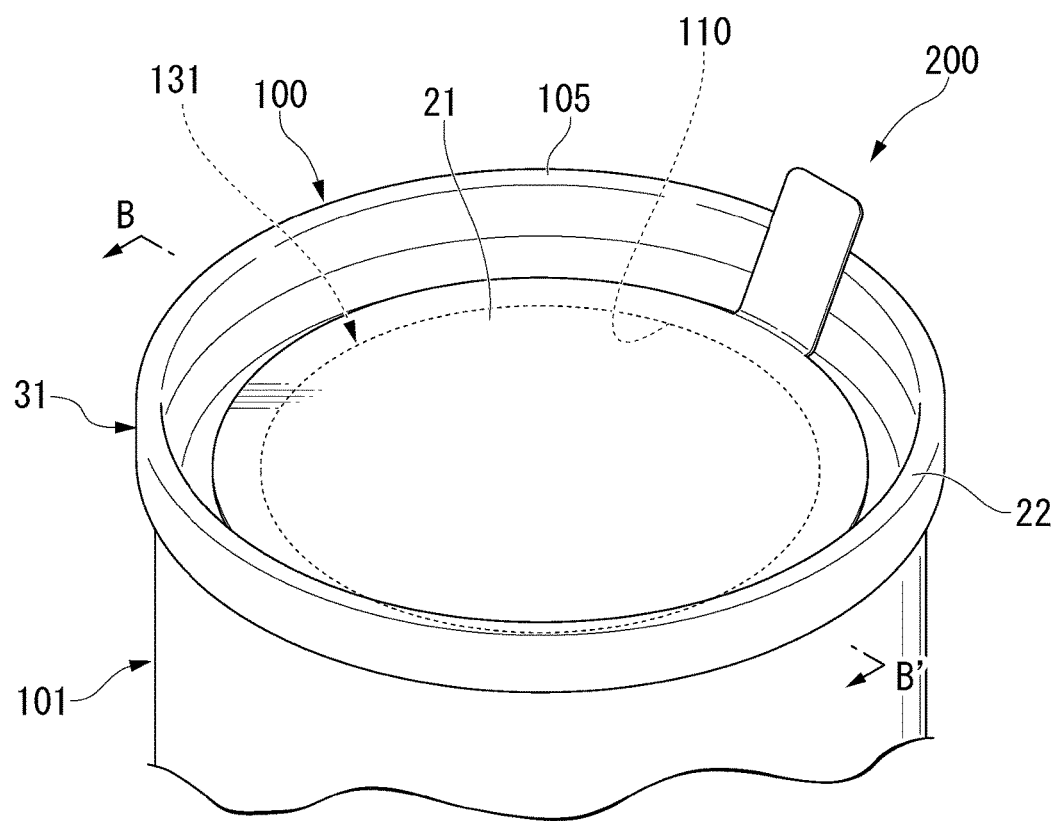
FIG. 2A is a perspective view of the heat sealed lid according to the embodiment of the present invention seamed around a can body.
Figure 2B:
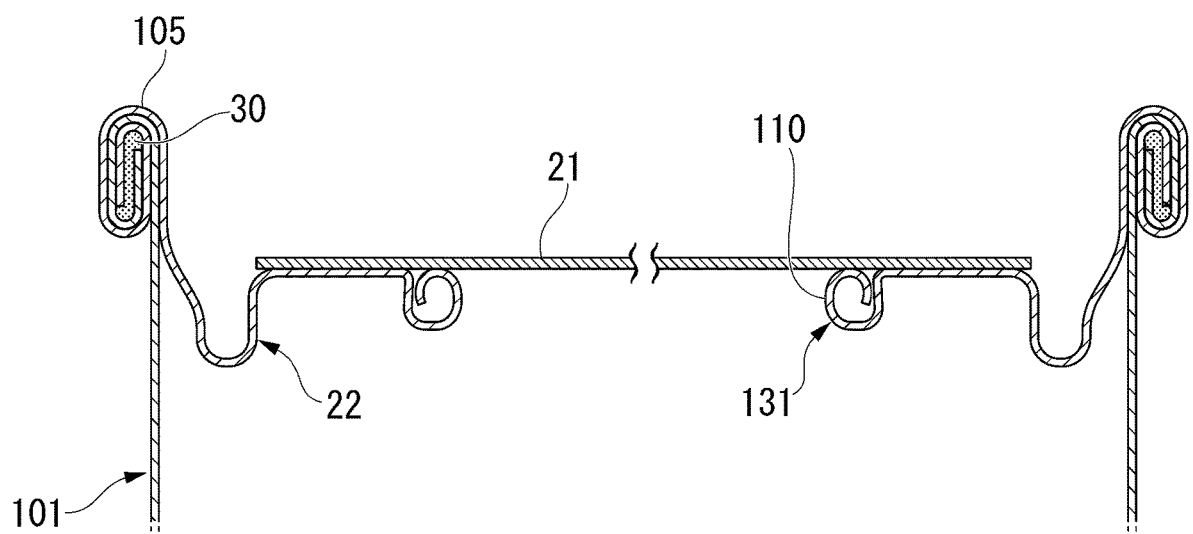
FIG. 2B is a sectional view taken along the line B-B' of the heat sealed lid according to the embodiment of the present invention seamed around the can body.

As shown in FIG. 2A, the can body (can) 200 according to the embodiment of the present invention is formed by seaming the heat sealed lid 100 according to the embodiment of the present invention around the can body 101. Seaming of the heat sealed lid 100 and the can body 101 is performed by placing the curled portion 103 of the heat sealed lid 100 on a flange of the can body 101 and bending the resultant, and seaming this by a seaming roll (not shown) from outside to inside gradually strongly to form a seamed portion 105 (FIG. 2B).

EXAMPLES

The heat sealed lid of the present invention will be specifically described with reference to examples. However, the conditions in the examples are one condition example adopted to confirm the feasibility and effects of the present invention, and the present invention is not limited to the following examples. Modifications can be made as appropriate within a range that can be adapted to the gist without departing from the gist of the present invention as long as the object of the present invention is achieved. Therefore, the present invention can employ various conditions, all of which are included in the technical features of the present invention.

Through examples and comparative examples, the contents of the metal sheet, which is a constituent material of the resin film laminate metal sheet, are shown in Table 1, the contents of the laminate film are shown in Table 2, and the contents of the polyester-based resin film that becomes the can inner surface side of the surface opposite to the heat sealed surface are shown in Table 3. In Table 2, PE of the adhesion layer is low-density polyethylene (melting point 121° C.) (NOVATEC LL, UF230 manufactured by Japan Polyethylene Corporation), PP of the adhesion layer is a homopolypropylene resin (NOVATEC PP, MA1B manufactured by Japan Polypropylene Corporation), and the PP resin in the intermediate layer is a homopolypropylene resin (NOVATEC PP, MA1B manufactured by Japan Polypropylene Corporation).

Tables 4-1 to 4-6 show the configuration and manufacturing conditions of the resin film laminate metal sheet, results of visual determination of whether or not the heat sealed surface was fused to the laminating roll during the manufacturing of the resin film laminate metal sheet, hot press conditions (temperature and pressurization time) during the manufacturing of a heat seal test body, evaluation of the peeling strength and heat sealability of the heat sealed portion of the heat seal test body, and results of evaluation of the sealability of the heat sealed portion when water pack retorting test was conducted with a can body for a water pack retorting test, which is produced using a heat sealed lid produced by heat-sealing the above-described resin laminate aluminum foil to the resin film laminate metal sheet made into a frame, and the peelability of the heat sealed lid.

TABLE 1

| | | | | Chemical treatment film | | |
|---|---|---|---|---|---|---|
| Symbol | Metal sheet | Thickness (mm) | Kind of coating, coating amount | Treatment contents | Kind of coating | Adhered amount |
| M1 | Steel sheet | 0.20 | Metal Cr: 80 (mg/m$^2$) | Chromic anhydride cathode electrolytic treatment (tin-free steel) | Cr oxides and hydroxides | 10 |
| M2 | Steel sheet | 0.20 | Sn—Fe alloy: 1.0 (mg/m$^2$) pure Sn: 0.3 (mg/m$^2$) | Chromic anhydride cathode electrolytic treatment | Cr oxides and hydroxides | 8 |
| M3 | Steel sheet | 0.20 | Sn—Fe alloy: 1.0 (mg/m$^2$) metal Sn: 0.3 (mg/m$^2$) | Zinc fluoride cathode electrolytic treatment | Zr oxides and hydroxides | 5 |
| M4 | Steel sheet | 0.20 | Sn—Fe alloy: 1.0 (mg/m$^2$) metal Sn: 0.3 (mg/m$^2$) | Titanium fluoride cathode electrolytic treatment | Ti oxides and hydroxides | 5 |
| M5 | Aluminum (A5052) | 0.20 | Absent | Zinc fluoride cathode electrolytic treatment | Zr oxides and hydroxides | 5 |

TABLE 2

| | Film configuration | | | | | | | | | |
|---|---|---|---|---|---|---|---|---|---|---|
| | Adhesion layer (heat sealed surface side) | | | Intermediate layer | | | Base layer (metal sheet fused surface side) | | | |
| Symbol | Resin configuration | Melting point (° C.) | Thickness (μm) | Resin configuration | Melting point (° C.) | Thickness (μm) | Resin configuration | Melting point (° C.) | Thickness (μm) | Total film thickness (μm) |
| P1 | PE-added PP (PE addition ratio 10 mass %) | 158 | 1.0 | PP resin | 160 | 15 | Maleic anhydride-modified PP resin | 83 | 1.0 | 17 |
| P2 | PE-added PP (PE addition ratio 10 mass %) | 158 | 1.0 | PP resin | 160 | 15 | Maleic anhydride-modified PP resin | 83 | 10.0 | 26 |

TABLE 2-continued

| | Film configuration | | | | | | | | | |
|---|---|---|---|---|---|---|---|---|---|---|
| | Adhesion layer (heat sealed surface side) | | | Intermediate layer | | | Base layer (metal sheet fused surface side) | | | |
| Symbol | Resin configuration | Melting point (° C.) | Thickness (μm) | Resin configuration | Melting point (° C.) | Thickness (μm) | Resin configuration | Melting point (° C.) | Thickness (μm) | Total film thickness (μm) |
| P3 | PE-added PP (PE addition ratio 10 mass %) | 158 | 1.0 | PP resin | 160 | 15 | Maleic anhydride-modified PP resin | 83 | 18.0 | 34 |
| P4 | PE-added PP (PE addition ratio 10 mass %) | 158 | 10.0 | PP resin | 160 | 15 | Maleic anhydride-modified PP resin | 83 | 1.0 | 26 |
| P5 | PE-added PP (PE addition ratio 10 mass %) | 158 | 10.0 | PP resin | 160 | 15 | Maleic anhydride-modified PP resin | 83 | 10.0 | 35 |
| P6 | PE-added PP (PE addition ratio 10 mass %) | 158 | 10.0 | PP resin | 160 | 15 | Maleic anhydride-modified PP resin | 83 | 18.0 | 43 |
| P7 | PE-added PP (PE addition ratio 10 mass %) | 158 | 15.0 | PP resin | 160 | 15 | Maleic anhydride-modified PP resin | 83 | 1.0 | 31 |
| P8 | PE-added PP (PE addition ratio 10 mass %) | 158 | 15.0 | PP resin | 160 | 15 | Maleic anhydride-modified PP resin | 83 | 10.0 | 40 |
| P9 | PE-added PP (PE addition ratio 10 mass %) | 158 | 15.0 | PP resin | 160 | 15 | Maleic anhydride-modified PP resin | 83 | 18.0 | 48 |
| P10 | PE-added PP (PE addition ratio 10 mass %) | 158 | 0.8 | PP resin | 160 | 15 | Maleic anhydride-modified PP resin | 83 | 10.0 | 25.8 |
| P11 | PE-added PP (PE addition ratio 10 mass %) | 158 | 16.0 | PP resin | 160 | 15 | Maleic anhydride-modified PP resin | 83 | 10.0 | 41 |
| P12 | PE-added PP (PE addition ratio 10 mass %) | 158 | 10.0 | PP resin | 160 | 15 | Maleic anhydride-modified PP resin | 83 | 0.8 | 25.8 |
| P13 | PE-added PP (PE addition ratio 10 mass %) | 158 | 10.0 | PP resin | 160 | 15 | Maleic anhydride-modified PP resin | 83 | 19.0 | 44 |
| P14 | PE-added PP (PE addition ratio 1 mass %) | 161.6 | 10.0 | PP resin | 160 | 15 | Maleic anhydride-modified PP resin | 83 | 5.0 | 30 |
| P15 | PE-added PP (PE addition ratio 45 mass %) | 143 | 10.0 | PP resin | 160 | 15 | Maleic anhydride-modified PP resin | 83 | 5.0 | 30 |
| P16 | PE-added PP (PE addition ratio 0.8 mass %) | 161.7 | 10.0 | PP resin | 160 | 15 | Maleic anhydride-modified PP resin | 83 | 5.0 | 30 |
| P17 | PE-added PP (PE addition ratio 46 mass %) | 143 | 10.0 | PP resin | 160 | 15 | Maleic anhydride-modified PP resin | 83 | 5.0 | 30 |
| P18 | PP resin (PE addition ratio 0 mass %) | 162 | 10.0 | PP resin | 160 | 15 | Maleic anhydride-modified PP resin | 83 | 5.0 | 30 |
| P19 | PE-added PP (PE addition ratio 60 mass %) | 137 | 10.0 | PP resin | 160 | 15 | Maleic anhydride-modified PP resin | 83 | 5.0 | 30 |
| P20 | PE-added PP (PE addition ratio 10 mass %) | 158 | 10.0 | Ionomer (20 μm)/ PP (20 μm)/ Ionomer (20 μm) three-layer structure | 132 | 60 | Maleic anhydride-modified PP resin | 83 | 10.0 | 80 |
| P21 | PE-added PP (PE addition ratio 10 mass %) | 158 | 10.0 | Ionomer resin | 101 | 15 | Maleic anhydride-modified PP resin | 83 | 10.0 | 35 |
| P22 | PE-added PP (PE addition ratio 10 mass %) | 158 | 10.0 | Methylpentene resin (TPX) | 224 | 15 | Maleic anhydride-modified PP resin | 83 | 10.0 | 35 |
| P23 | PE-added PP (PE addition ratio 10 mass %) | 158 | 1.0 | Absent | | | Maleic anhydride-modified PP resin | 83 | 5.0 | 6 |
| P24 | PE-added PP (PE addition ratio 10 mass %) | 158 | 5.0 | Absent | | | Maleic anhydride-modified PP resin | 83 | 1.0 | 6 |
| P25 | Maleic anhydride-modified PP resin | 158 | 10.0 | PP resin | 160 | 15 | Maleic anhydride-modified PP resin | 83 | 5.0 | 30 |

TABLE 3

| Symbol | Film content | Intrinsic viscosity IV | Glass transition temperature Tg (° C.) | Crystallization temperature Tc (° C.) | Melting point Tm (° C.) | Heat shrinkage (%) | Thickness (μm) | Elongation (%) |
|---|---|---|---|---|---|---|---|---|
| E1 | Stretched HOMO-PET film | 0.60 | 70 | 150 | 252 | 10 | 19 | 110 |
| E2 | Stretched IA (12 mol %)-PET film | 0.60 | 68 | 125 | 227 | 5 | 19 | 150 |
| E3 | Stretched PET-PBT (50 mass %) film | 0.60 | 65 | 150 | 213 | 5 | 12 | 130 |
| E4 | Unstretched PET-based film | 0.65 | 65 | 150 | 200 | 0 | 20 | 300 |

TABLE 4-1

Film-laminated metal sheet configuration and sealability

| Experiment No. | Metal sheet | Film combination Laminated film | Film combination Second resin film | Laminating temperature (° C.) | Difference in melting point between adhesion layer and second resin film (° C.) | Present or absence of fusion of resin on heat sealed surface to laminating roll | Heat sealing conditions Heat sealing temperature (° C.) | Heat sealing conditions Heat sealing time (sec) |
|---|---|---|---|---|---|---|---|---|
| 1 | M1 | P1 | E1 | 265 | 94 | Absent | 180 | 0.5 |
| 2 | M1 | P2 | E1 | 265 | 94 | Absent | 180 | 0.5 |
| 3 | M1 | P3 | E1 | 265 | 94 | Absent | 180 | 0.5 |
| 4 | M1 | P4 | E1 | 265 | 94 | Absent | 180 | 0.5 |
| 5 | M1 | P5 | E1 | 265 | 94 | Absent | 180 | 0.5 |
| 6 | M1 | P6 | E1 | 265 | 94 | Absent | 180 | 0.5 |
| 7 | M1 | P7 | E1 | 265 | 94 | Absent | 180 | 0.5 |
| 8 | M1 | P8 | E1 | 265 | 94 | Absent | 180 | 0.5 |
| 9 | M1 | P9 | E1 | 265 | 94 | Absent | 180 | 0.5 |
| 10 | M1 | P10 | E1 | 265 | 94 | Absent | 180 | 0.5 |
| 11 | M1 | P11 | E1 | 265 | 94 | Absent | 180 | 0.5 |
| 12 | M1 | P12 | E1 | 265 | 94 | Absent | 180 | 0.5 |
| 13 | M1 | P13 | E1 | 265 | 94 | Absent | 180 | 0.5 |
| 14 | M1 | P14 | E1 | 265 | 90.4 | Absent | 180 | 0.5 |
| 15 | M1 | P15 | E1 | 265 | 109 | Absent | 180 | 0.5 |
| 16 | M1 | P16 | E1 | 265 | 90.3 | Absent | 180 | 0.5 |
| 17 | M1 | P17 | E1 | 265 | 109 | Absent | 180 | 0.5 |
| 18 | M1 | P18 | E1 | 265 | 90 | Absent | 180 | 0.5 |
| 19 | M1 | P19 | E1 | 265 | 115 | Absent | 180 | 0.5 |
| 20 | M1 | P20 | E1 | 265 | 94 | Absent | 180 | 0.5 |
| 21 | M1 | P21 | E1 | 265 | 94 | Absent | 180 | 0.5 |
| 22 | M1 | P22 | E1 | 265 | 94 | Absent | 180 | 0.5 |
| 23 | M1 | P23 | E1 | 265 | 94 | Absent | 180 | 0.5 |
| 24 | M1 | P24 | E1 | 265 | 94 | Absent | 180 | 0.5 |
| 25 | M1 | P25 | E1 | 265 | 94 | Present | 180 | 0.5 |

| Experiment No. | Heat sealed portion peeling strength evaluation result | Heat sealability evaluation result | Heat sealed portion sealability determination result | Heat sealed lid peelability determination result | Classification of invention example and comparative example |
|---|---|---|---|---|---|
| 1 | Good | Acceptable | Acceptable | Acceptable | Invention Example |
| 2 | Good | Acceptable | Acceptable | Acceptable | Invention Example |
| 3 | Good | Acceptable | Acceptable | Acceptable | Invention Example |
| 4 | Excellent | Good | Acceptable | Acceptable | Invention Example |
| 5 | Excellent | Good | Good | Acceptable | Invention Example |
| 6 | Excellent | Good | Acceptable | Acceptable | Invention Example |
| 7 | Excellent | Good | Acceptable | Acceptable | Invention Example |
| 8 | Excellent | Good | Acceptable | Acceptable | Invention Example |
| 9 | Excellent | Good | Acceptable | Acceptable | Invention Example |
| 10 | Acceptable | Good | Unacceptable | Acceptable | Comparative Example |
| 11 | Good | Good | Unacceptable | Acceptable | Comparative Example |
| 12 | Acceptable | Good | Unacceptable | Acceptable | Comparative Example |
| 13 | Good | Good | Unacceptable | Acceptable | Comparative Example |
| 14 | Good | Acceptable | Acceptable | Acceptable | Invention Example |
| 15 | Good | Good | Acceptable | Acceptable | Invention Example |
| 16 | Good | Unacceptable | Acceptable | Acceptable | Comparative Example |
| 17 | Good | Acceptable | Unacceptable | Acceptable | Comparative Example |

TABLE 4-1-continued

| | | | | | |
|---|---|---|---|---|---|
| 18 | Excellent | Unacceptable | Unacceptable | Acceptable | Comparative Example |
| 19 | Good | Unacceptable | Unacceptable | Acceptable | Comparative Example |
| 20 | Excellent | Good | Good | Acceptable | Invention Example |
| 21 | Excellent | Good | Good | Acceptable | Invention Example |
| 22 | Excellent | Good | Good | Acceptable | Invention Example |
| 23 | Acceptable | Acceptable | Acceptable | Acceptable | Invention Example |
| 24 | Acceptable | Acceptable | Acceptable | Acceptable | Invention Example |
| 25 | Excellent | Good | Good | Acceptable | Comparative Example |

TABLE 4-2

Film-laminated metal sheet configuration and sealability

| Experiment No. | Metal sheet | Film combination Laminated film | Film combination Second resin film | Laminating temperature (° C.) | Difference in melting point between adhesion layer and second resin film (° C.) | Present or absence of fusion of resin on heat sealed surface to laminating roll | Heat sealing conditions Heat sealing temperature (° C.) | Heat sealing conditions Heat sealing time (sec) |
|---|---|---|---|---|---|---|---|---|
| 26 | M1 | P1 | E1 | 265 | 94 | Absent | 180 | 1 |
| 27 | M1 | P2 | E1 | 265 | 94 | Absent | 180 | 1 |
| 28 | M1 | P3 | E1 | 265 | 94 | Absent | 180 | 1 |
| 29 | M1 | P4 | E1 | 265 | 94 | Absent | 180 | 1 |
| 30 | M1 | P5 | E1 | 265 | 94 | Absent | 180 | 1 |
| 31 | M1 | P6 | E1 | 265 | 94 | Absent | 180 | 1 |
| 32 | M1 | P7 | E1 | 265 | 94 | Absent | 180 | 1 |
| 33 | M1 | P8 | E1 | 265 | 94 | Absent | 180 | 1 |
| 34 | M1 | P9 | E1 | 265 | 94 | Absent | 180 | 1 |
| 35 | M1 | P10 | E1 | 265 | 94 | Absent | 180 | 1 |
| 36 | M1 | P11 | E1 | 265 | 94 | Absent | 180 | 1 |
| 37 | M1 | P12 | E1 | 265 | 94 | Absent | 180 | 1 |
| 38 | M1 | P13 | E1 | 265 | 94 | Absent | 180 | 1 |
| 39 | M1 | P14 | E1 | 265 | 90.4 | Absent | 180 | 1 |
| 40 | M1 | P15 | E1 | 265 | 109 | Absent | 180 | 1 |
| 41 | M1 | P16 | E1 | 265 | 90.3 | Absent | 180 | 1 |
| 42 | M1 | P17 | E1 | 265 | 109 | Absent | 180 | 1 |
| 43 | M1 | P18 | E1 | 265 | 90 | Absent | 180 | 1 |
| 44 | M1 | P19 | E1 | 265 | 115 | Absent | 180 | 1 |
| 45 | M1 | P20 | E1 | 265 | 94 | Absent | 180 | 1 |
| 46 | M1 | P21 | E1 | 265 | 94 | Absent | 180 | 1 |
| 47 | M1 | P22 | E1 | 265 | 94 | Absent | 180 | 1 |
| 48 | M1 | P23 | E1 | 265 | 94 | Absent | 180 | 1 |
| 49 | M1 | P24 | E1 | 265 | 94 | Absent | 180 | 1 |
| 50 | M1 | P25 | E1 | 265 | 94 | Present | 180 | 1 |

| Experiment No. | Heat sealed portion peeling strength evaluation result | Heat sealability evaluation result | Heat sealed portion sealability determination result | Heat sealed lid peelability determination result | Classification of invention example and comparative example |
|---|---|---|---|---|---|
| 26 | Good | Acceptable | Acceptable | Acceptable | Invention Example |
| 27 | Good | Acceptable | Acceptable | Acceptable | Invention Example |
| 28 | Good | Acceptable | Acceptable | Acceptable | Invention Example |
| 29 | Excellent | Good | Acceptable | Acceptable | Invention Example |
| 30 | Excellent | Good | Good | Acceptable | Invention Example |
| 31 | Excellent | Good | Acceptable | Acceptable | Invention Example |

TABLE 4-2-continued

| | | | | | |
|---|---|---|---|---|---|
| 32 | Excellent | Good | Acceptable | Acceptable | Invention Example |
| 33 | Excellent | Good | Acceptable | Acceptable | Invention Example |
| 34 | Excellent | Good | Acceptable | Acceptable | Invention Example |
| 35 | Acceptable | Good | Unacceptable | Acceptable | Comparative Example |
| 36 | Good | Good | Unacceptable | Acceptable | Comparative Example |
| 37 | Acceptable | Good | Unacceptable | Acceptable | Comparative Example |
| 38 | Good | Good | Unacceptable | Acceptable | Comparative Example |
| 39 | Good | Acceptable | Acceptable | Acceptable | Invention Example |
| 40 | Good | Good | Acceptable | Acceptable | Invention Example |
| 41 | Good | Unacceptable | Acceptable | Acceptable | Comparative Example |
| 42 | Good | Acceptable | Unacceptable | Acceptable | Comparative Example |
| 43 | Excellent | Unacceptable | Unacceptable | Acceptable | Comparative Example |
| 44 | Good | Unacceptable | Unacceptable | Acceptable | Comparative Example |
| 45 | Excellent | Good | Good | Acceptable | Invention Example |
| 46 | Excellent | Good | Good | Acceptable | Invention Example |
| 47 | Excellent | Good | Good | Acceptable | Invention Example |
| 48 | Acceptable | Acceptable | Acceptable | Acceptable | Invention Example |
| 49 | Acceptable | Acceptable | Acceptable | Acceptable | Invention Example |
| 50 | Excellent | Good | Good | Acceptable | Comparative Example |

TABLE 4-3

Film-laminated metal sheet configuration and sealability

| | | Film combination | | Laminating temperature (° C.) | Difference in melting point between adhesion layer and second resin film (° C.) | Present or absence of fusion of resin on heat sealed surface to laminating roll | Heat sealing conditions | |
|---|---|---|---|---|---|---|---|---|
| Experiment No. | Metal sheet | Laminated film | Second resin film | | | | Heat sealing temperature (° C.) | Heat sealing time (sec) |
| 51 | M1 | P1 | E2 | 245 | 69 | Absent | 180 | 1 |
| 52 | M1 | P2 | E2 | 245 | 69 | Absent | 180 | 1 |
| 53 | M1 | P3 | E2 | 245 | 69 | Absent | 180 | 1 |
| 54 | M1 | P4 | E2 | 245 | 69 | Absent | 180 | 1 |
| 55 | M1 | P5 | E2 | 245 | 69 | Absent | 180 | 1 |
| 56 | M1 | P6 | E2 | 245 | 69 | Absent | 180 | 1 |
| 57 | M1 | P7 | E2 | 245 | 69 | Absent | 180 | 1 |
| 58 | M1 | P8 | E2 | 245 | 69 | Absent | 180 | 1 |
| 59 | M1 | P9 | E2 | 245 | 69 | Absent | 180 | 1 |
| 60 | M1 | P10 | E2 | 245 | 69 | Absent | 180 | 1 |
| 61 | M1 | P11 | E2 | 245 | 69 | Absent | 180 | 1 |
| 62 | M1 | P12 | E2 | 245 | 69 | Absent | 180 | 1 |
| 63 | M1 | P13 | E2 | 245 | 69 | Absent | 180 | 1 |
| 64 | M1 | P14 | E2 | 245 | 65.4 | Absent | 180 | 1 |
| 65 | M1 | P15 | E2 | 245 | 84 | Absent | 180 | 1 |
| 66 | M1 | P16 | E2 | 245 | 65.3 | Absent | 180 | 1 |
| 67 | M1 | P17 | E2 | 245 | 84 | Absent | 180 | 1 |
| 68 | M1 | P18 | E2 | 245 | 65 | Absent | 180 | 1 |
| 69 | M1 | P19 | E2 | 245 | 90 | Absent | 180 | 1 |
| 70 | M1 | P20 | E2 | 245 | 69 | Absent | 180 | 1 |
| 71 | M1 | P21 | E2 | 245 | 69 | Absent | 180 | 1 |
| 72 | M1 | P22 | E2 | 245 | 69 | Absent | 180 | 1 |
| 73 | M1 | P23 | E2 | 245 | 69 | Absent | 180 | 1 |

TABLE 4-3-continued

| | | | | | | | | |
|---|---|---|---|---|---|---|---|---|
| 74 | M1 | P24 | E2 | 245 | 69 | Absent | 180 | 1 |
| 75 | M1 | P25 | E2 | 245 | 69 | Present | 180 | 1 |

| | Evaluation results | | | | |
|---|---|---|---|---|---|
| Experiment No. | Heat sealed portion peeling strength evaluation result | Heat sealability evaluation result | Heat sealed portion sealability determination result | Heat sealed lid peelability determination result | Classification of invention example and comparative example |
| 51 | Good | Acceptable | Acceptable | Acceptable | Invention Example |
| 52 | Good | Acceptable | Acceptable | Acceptable | Invention Example |
| 53 | Good | Acceptable | Acceptable | Acceptable | Invention Example |
| 54 | Excellent | Good | Acceptable | Acceptable | Invention Example |
| 55 | Excellent | Good | Good | Acceptable | Invention Example |
| 56 | Excellent | Good | Acceptable | Acceptable | Invention Example |
| 57 | Excellent | Good | Acceptable | Acceptable | Invention Example |
| 58 | Excellent | Good | Acceptable | Acceptable | Invention Example |
| 59 | Excellent | Good | Acceptable | Acceptable | Invention Example |
| 60 | Acceptable | Good | Unacceptable | Acceptable | Comparative Example |
| 61 | Good | Good | Unacceptable | Acceptable | Comparative Example |
| 62 | Acceptable | Good | Unacceptable | Acceptable | Comparative Example |
| 63 | Good | Good | Unacceptable | Acceptable | Comparative Example |
| 64 | Good | Acceptable | Acceptable | Acceptable | Invention Example |
| 65 | Good | Good | Acceptable | Acceptable | Invention Example |
| 66 | Good | Unacceptable | Acceptable | Acceptable | Comparative Example |
| 67 | Good | Acceptable | Unacceptable | Acceptable | Comparative Example |
| 68 | Excellent | Unacceptable | Unacceptable | Acceptable | Comparative Example |
| 69 | Good | Unacceptable | Unacceptable | Acceptable | Comparative Example |
| 70 | Excellent | Good | Good | Acceptable | Invention Example |
| 71 | Excellent | Good | Good | Acceptable | Invention Example |
| 72 | Excellent | Good | Good | Acceptable | Invention Example |
| 73 | Acceptable | Acceptable | Acceptable | Acceptable | Invention Example |
| 74 | Acceptable | Acceptable | Acceptable | Acceptable | Invention Example |
| 75 | Excellent | Good | Good | Acceptable | Comparative Example |

TABLE 4-4

| Film-laminated metal sheet configuration and sealability | | | | | | | |
|---|---|---|---|---|---|---|---|
| | | Film combination | | Laminating temperature (° C.) | Difference in melting point between adhesion layer and second resin film (° C.) | Present or absence of fusion of resin on heat sealed surface to laminating roll | Heat sealing conditions | |
| Experiment No. | Metal sheet | Laminated film | Second resin film | | | | Heat sealing temperature (° C.) | Heat sealing time (sec) |
| 76 | M1 | P1 | E3 | 230 | 55 | Absent | 180 | 1 |
| 77 | M1 | P2 | E3 | 230 | 55 | Absent | 180 | 1 |

TABLE 4-4-continued

| | | | | | | | | |
|---|---|---|---|---|---|---|---|---|
| 78 | M1 | P3 | E3 | 230 | 55 | Absent | 180 | 1 |
| 79 | M1 | P4 | E3 | 230 | 55 | Absent | 180 | 1 |
| 80 | M1 | P5 | E3 | 230 | 55 | Absent | 180 | 1 |
| 81 | M1 | P6 | E3 | 230 | 55 | Absent | 180 | 1 |
| 82 | M1 | P7 | E3 | 230 | 55 | Absent | 180 | 1 |
| 83 | M1 | P8 | E3 | 230 | 55 | Absent | 180 | 1 |
| 84 | M1 | P9 | E3 | 230 | 55 | Absent | 180 | 1 |
| 85 | M1 | P10 | E3 | 230 | 55 | Absent | 180 | 1 |
| 86 | M1 | P11 | E3 | 230 | 55 | Absent | 180 | 1 |
| 87 | M1 | P12 | E3 | 230 | 55 | Absent | 180 | 1 |
| 88 | M1 | P13 | E3 | 230 | 55 | Absent | 180 | 1 |
| 89 | M1 | P14 | E3 | 230 | 51.4 | Absent | 180 | 1 |
| 90 | M1 | P15 | E3 | 230 | 70 | Absent | 180 | 1 |
| 91 | M1 | P16 | E3 | 230 | 51.3 | Absent | 180 | 1 |
| 92 | M1 | P17 | E3 | 230 | 70 | Absent | 180 | 1 |
| 93 | M1 | P18 | E3 | 245 | 51 | Absent | 180 | 1 |
| 94 | M1 | P19 | E3 | 245 | 76 | Absent | 180 | 1 |
| 95 | M1 | P20 | E3 | 245 | 55 | Absent | 180 | 1 |
| 96 | M1 | P21 | E3 | 245 | 55 | Absent | 180 | 1 |
| 97 | M1 | P22 | E3 | 245 | 55 | Absent | 180 | 1 |
| 98 | M1 | P23 | E3 | 245 | 55 | Absent | 180 | 1 |
| 99 | M1 | P24 | E3 | 245 | 55 | Absent | 180 | 1 |
| 100 | M1 | P25 | E3 | 245 | 55 | Present | 180 | 1 |

| | Evaluation results | | | | |
|---|---|---|---|---|---|
| Experiment No. | Heat sealed portion peeling strength evaluation result | Heat sealability evaluation result | Heat sealed portion sealability determination result | Heat sealed lid peelability determination result | Classification of invention example and comparative example |
| 76 | Good | Acceptable | Acceptable | Acceptable | Invention Example |
| 77 | Good | Acceptable | Acceptable | Acceptable | Invention Example |
| 78 | Good | Acceptable | Acceptable | Acceptable | Invention Example |
| 79 | Excellent | Good | Acceptable | Acceptable | Invention Example |
| 80 | Excellent | Good | Good | Acceptable | Invention Example |
| 81 | Excellent | Good | Acceptable | Acceptable | Invention Example |
| 82 | Excellent | Good | Acceptable | Acceptable | Invention Example |
| 83 | Excellent | Good | Acceptable | Acceptable | Invention Example |
| 84 | Excellent | Good | Acceptable | Acceptable | Invention Example |
| 85 | Acceptable | Good | Unacceptable | Acceptable | Comparative Example |
| 86 | Good | Good | Unacceptable | Acceptable | Comparative Example |
| 87 | Acceptable | Good | Unacceptable | Acceptable | Comparative Example |
| 88 | Good | Good | Unacceptable | Acceptable | Comparative Example |
| 89 | Good | Acceptable | Acceptable | Acceptable | Invention Example |
| 90 | Good | Good | Acceptable | Acceptable | Invention Example |
| 91 | Good | Unacceptable | Acceptable | Acceptable | Comparative Example |
| 92 | Good | Acceptable | Unacceptable | Acceptable | Comparative Example |
| 93 | Excellent | Unacceptable | Unacceptable | Acceptable | Comparative Example |
| 94 | Good | Unacceptable | Unacceptable | Acceptable | Comparative Example |
| 95 | Excellent | Good | Good | Acceptable | Invention Example |
| 96 | Excellent | Good | Good | Acceptable | Invention Example |
| 97 | Excellent | Good | Good | Acceptable | Invention Example |
| 98 | Acceptable | Acceptable | Acceptable | Acceptable | Invention Example |

TABLE 4-4-continued

| | | | | | |
|---|---|---|---|---|---|
| 99 | Acceptable | Acceptable | Acceptable | Acceptable | Invention Example |
| 100 | Excellent | Good | Good | Acceptable | Comparative Example |

TABLE 4-5

Film-laminated metal sheet configuration and sealability

| | | Film combination | | Laminating | Difference in melting point between adhesion layer and second resin film (° C.) | Present or absence of fusion of resin on heat sealed surface to laminating roll | Heat sealing conditions | |
|---|---|---|---|---|---|---|---|---|
| Experiment No. | Metal sheet | Laminated film | Second resin film | temperature (° C.) | | | Heat sealing temperature (° C.) | Heat sealing time (sec) |
| 101 | M1 | P1 | E4 | 215 | 42 | Absent | 180 | 1 |
| 102 | M1 | P2 | E4 | 215 | 42 | Absent | 180 | 1 |
| 103 | M1 | P3 | E4 | 215 | 42 | Absent | 180 | 1 |
| 104 | M1 | P4 | E4 | 215 | 42 | Absent | 180 | 1 |
| 105 | M1 | P5 | E4 | 215 | 42 | Absent | 180 | 1 |
| 106 | M1 | P6 | E4 | 215 | 42 | Absent | 180 | 1 |
| 107 | M1 | P7 | E4 | 215 | 42 | Absent | 180 | 1 |
| 108 | M1 | P8 | E4 | 215 | 42 | Absent | 180 | 1 |
| 109 | M1 | P9 | E4 | 215 | 42 | Absent | 180 | 1 |
| 110 | M1 | P10 | E4 | 215 | 42 | Absent | 180 | 1 |
| 111 | M1 | P11 | E4 | 215 | 42 | Absent | 180 | 1 |
| 112 | M1 | P12 | E4 | 215 | 42 | Absent | 180 | 1 |
| 113 | M1 | P13 | E4 | 215 | 42 | Absent | 180 | 1 |
| 114 | M1 | P14 | E4 | 215 | 38.4 | Present | 180 | 1 |
| 115 | M1 | P15 | E4 | 215 | 57 | Absent | 180 | 1 |
| 116 | M1 | P16 | E4 | 215 | 38.3 | Present | 180 | 1 |
| 117 | M1 | P17 | E4 | 215 | 57 | Absent | 180 | 1 |
| 118 | M1 | P18 | E4 | 215 | 38 | Present | 180 | 1 |
| 119 | M1 | P19 | E4 | 215 | 63 | Absent | 180 | 1 |
| 120 | M1 | P20 | E4 | 215 | 42 | Absent | 180 | 1 |
| 121 | M1 | P21 | E4 | 215 | 42 | Absent | 180 | 1 |
| 122 | M1 | P22 | E4 | 215 | 42 | Absent | 180 | 1 |
| 123 | M1 | P23 | E4 | 215 | 42 | Absent | 180 | 1 |
| 124 | M1 | P24 | E4 | 215 | 42 | Absent | 180 | 1 |
| 125 | M1 | P25 | E4 | 215 | 42 | Present | 180 | 1 |

| | Evaluation results | | | | |
|---|---|---|---|---|---|
| Experiment No. | Heat sealed portion peeling strength evaluation result | Heat sealability evaluation result | Heat sealed portion sealability determination result | Heat sealed lid peelability determination result | Classification of invention example and comparative example |
| 101 | Good | Acceptable | Acceptable | Acceptable | Invention Example |
| 102 | Good | Acceptable | Acceptable | Acceptable | Invention Example |
| 103 | Good | Acceptable | Acceptable | Acceptable | Invention Example |
| 104 | Excellent | Good | Acceptable | Acceptable | Invention Example |
| 105 | Excellent | Good | Good | Acceptable | Invention Example |
| 106 | Excellent | Good | Acceptable | Acceptable | Invention Example |
| 107 | Excellent | Good | Acceptable | Acceptable | Invention Example |
| 108 | Excellent | Good | Acceptable | Acceptable | Invention Example |
| 109 | Excellent | Good | Acceptable | Acceptable | Invention Example |
| 110 | Acceptable | Good | Unacceptable | Acceptable | Comparative Example |
| 111 | Good | Good | Unacceptable | Acceptable | Comparative Example |
| 112 | Acceptable | Good | Unacceptable | Acceptable | Comparative Example |

TABLE 4-5-continued

| | | | | | |
|---|---|---|---|---|---|
| 113 | Good | Good | Unacceptable | Acceptable | Comparative Example |
| 114 | Good | Acceptable | Acceptable | Unacceptable | Comparative Example |
| 115 | Good | Good | Acceptable | Acceptable | Invention Example |
| 116 | Good | Unacceptable | Acceptable | Unacceptable | Comparative Example |
| 117 | Good | Acceptable | Unacceptable | Acceptable | Comparative Example |
| 118 | Excellent | Unacceptable | Unacceptable | Unacceptable | Comparative Example |
| 119 | Good | Unacceptable | Unacceptable | Acceptable | Comparative Example |
| 120 | Excellent | Good | Good | Acceptable | Invention Example |
| 121 | Excellent | Good | Good | Acceptable | Invention Example |
| 122 | Excellent | Good | Good | Acceptable | Invention Example |
| 123 | Acceptable | Acceptable | Acceptable | Acceptable | Invention Example |
| 124 | Acceptable | Acceptable | Acceptable | Acceptable | Invention Example |
| 125 | Excellent | Good | Good | Acceptable | Comparative Example |

TABLE 4-6

| | | Film-laminated metal sheet configuration and sealability | | | | | |
|---|---|---|---|---|---|---|---|
| | | Film combination | | Laminating | Difference in melting point between adhesion layer and second resin film (° C.) | Present or absence of fusion of resin on heat sealed surface to laminating roll | Heat sealing conditions | |
| Experiment No. | Metal sheet | Laminated film | Second resin film | temperature (° C.) | | | Heat sealing temperature (° C.) | Heat sealing time (sec) |
| 126 | M2 | P1 | E1 | 265 | 94 | Absent | 180 | 1 |
| 127 | M2 | P1 | E2 | 245 | 69 | Absent | 180 | 1 |
| 128 | M2 | P1 | E3 | 230 | 55 | Absent | 180 | 1 |
| 129 | M3 | P1 | E1 | 265 | 94 | Absent | 180 | 1 |
| 130 | M3 | P1 | E2 | 245 | 69 | Absent | 180 | 1 |
| 131 | M3 | P1 | E3 | 230 | 55 | Absent | 180 | 1 |
| 132 | M4 | P1 | E1 | 265 | 94 | Absent | 180 | 1 |
| 133 | M4 | P1 | E2 | 245 | 69 | Absent | 180 | 1 |
| 134 | M4 | P1 | E3 | 230 | 55 | Absent | 180 | 1 |
| 135 | M5 | P1 | E1 | 265 | 94 | Absent | 180 | 1 |
| 136 | M5 | P1 | E2 | 245 | 69 | Absent | 180 | 1 |
| 137 | M5 | P1 | E3 | 230 | 55 | Absent | 180 | 1 |

| Experiment No. | Heat sealed portion peeling strength evaluation result | Heat sealability evaluation result | Heat sealed portion sealability determination result | Heat sealed lid peelability determination result | Classification of invention example and comparative example |
|---|---|---|---|---|---|
| 126 | Good | Good | Good | Acceptable | Invention Example |
| 127 | Good | Good | Good | Acceptable | Invention Example |
| 128 | Good | Good | Good | Acceptable | Invention Example |
| 129 | Good | Good | Good | Acceptable | Invention Example |
| 130 | Good | Good | Good | Acceptable | Invention Example |
| 131 | Good | Good | Good | Acceptable | Invention Example |
| 132 | Good | Good | Good | Acceptable | Invention Example |
| 133 | Good | Good | Good | Acceptable | Invention Example |

TABLE 4-6-continued

| | | | | | |
|---|---|---|---|---|---|
| 134 | Good | Good | Good | Acceptable | Invention Example |
| 135 | Good | Good | Good | Acceptable | Invention Example |
| 136 | Good | Good | Good | Acceptable | Invention Example |
| 137 | Good | Good | Good | Acceptable | Invention Example |

Constituent materials of the resin film laminate metal sheet, which are the materials of the seamed side frame included in the heat sealed lid, are shown below.

1. Metal Sheet

Metal sheets M1 to M5 shown in Table 1 were used. In a case where the metal sheet is a coated steel sheet or a chemical treatment steel sheet, the contents are also shown below.

M1 to M5 are metal sheets obtained by subjecting a metal sheet having a thickness of 0.20 mm and a surface roughness of Ra=0.3 μm to a cathode electrolytic treatment in a 5% aqueous sodium hydroxide solution to perform alkaline degreasing. M1 is a tin-free steel sheet having a metal chromium layer (80 mg/m$^2$) and a chromium hydrated oxide layer (10 mg/m$^2$) on the steel sheet surface. M2 is a reflowed tin-coated steel sheet, and is a so-called tin steel sheet having a Sn—Fe alloy layer (1.3 g/m$^2$), a pure Sn layer (1.5 g/m$^2$), and a chromium hydrated oxide layer (10 mg/m$^2$) from the steel sheet side.

M3 is a reflowed tin-coated steel sheet, and is a chromate-free Sn-coated steel sheet having a Sn—Fe alloy layer (1.3 g/m$^2$), a Sn layer (1.5 g/m$^2$), and a chromate-free type chemical treatment film primarily containing $ZrO_2$ (Zr content 5 mg/m$^2$) from the steel sheet side. M4 is a reflowed tin-coated steel sheet, and is a chromate-free Sn-coated steel sheet having a Sn—Fe alloy layer (1.3 g/m$^2$), a Sn layer (1.5 g/m$^2$), and a chromate-free type chemical treatment film primarily containing $TiO_2$ (Ti content 5 mg/m$^2$) from the steel sheet side. M5 is a chromate-free type aluminum sheet having a chromate-free type chemical treatment film in which a coating layer of $ZrO_2$ (Zr content 5 mg/m$^2$) is formed on an aluminum alloy sheet (A5052).

2. Resin Film

As the laminate film 13 of the resin film laminate metal sheet 22 which is a material of the seamed side frame included in the heat sealed lid 100, thermoplastic films of polyolefin-based resins of P1 to P25 shown in Table 2 were used, and as the resin film on the side opposite to the heat sealing side, thermoplastic polyester-based resin films of E1 to E4 shown in Table 3 were used.

P1 to P25 of the laminate film 13 of the resin film laminate metal sheet 22 are the polyethylene-based resin-added polypropylene-based resin layer (adhesion layer) 3/the polypropylene-based resin layer (intermediate layer) 5/the modified polypropylene-based resin layer (base layer) 4 in order from the surface layer on the heat sealing side, and are resin films in which the thickness of the surface layer, the thickness of the modified polypropylene-based resin layer, and the addition ratio (content) of the polyethylene-based resin added to the polypropylene-based resin layer are changed.

As the polyester-based resin film, a biaxially stretched film of polyethylene terephthalate (PET) having a melting point of 252° C. as shown in E1 of Table 3, a biaxially stretched film (IA-PET) of a copolymer of polyethylene terephthalate and polyethylene isophthalate (isophthalate occupies 12 mol %) having a melting point of 227° C. as shown in E2, a biaxially stretched film (PET-PBT) of a copolymer of unstretched polyethylene terephthalate and polybutylene terephthalate having a melting point of 213° C. as shown in E3, and an unstretched PET film having a melting point of 200° C. as shown in E4, were used.

As the melting point of the laminate film, the temperature of the main endothermic peak when the resin of each layer was collected by melting and extruding the resin of each layer from a T-die of a resin film forming machine and was thermally analyzed by a differential scanning-type calorimeter (DSC) was used. Here, the main endothermic peak means a peak having the largest endothermic amount. The DSC apparatus used for the melting point measurement is DSC7030 manufactured by Hitachi High-Tech Science Corporation, and measurement was performed by enclosing 5 to 8 mg of the resin in an aluminum pan and raising the temperature in a nitrogen atmosphere at a temperature rising rate of 10° C./min.

3. Film Laminating Method

The method of laminating the film of the resin film laminate metal sheet that forms the frame side of the heat sealed lid 100 was implemented by the dedicated resin-film laminating apparatus provided with the metal sheet feeding device, the metal heating hot press for heating the metal sheet, and the film feeding device for front and rear surfaces, the heat-resistant rubber laminating roll (controlling the surface temperature of the rubber roll with a metal heating backup roll), and the cooling water tank shown in FIG. 3. With this apparatus, a resin film laminate metal sheet for a test (sheet width 200 mm, sheet length 200 mm) was produced.

Tables 4-1 to 4-6 show the configuration and laminating temperature of the resin film laminate metal sheet produced by the above manufacturing method, and results of visual determination of whether or not the resin film on the heat sealing side was fused to the laminating roll during the manufacturing of the resin film laminate metal sheet.

4. Heat Sealed Portion Peeling Strength Evaluation Method

A method of evaluating the strength of the heat sealed portion of the resin laminate aluminum foil and the resin film laminate metal sheet that forms the frame side of the heat sealed lid 100 is as follows.

The resin laminate aluminum foil (a 50 μm thick aluminum foil and a 50 μm thick of polyolefin-based hot melt resin (melting point 141° C.) on heat sealed surface) cut to a size of 50 mm×100 mm and the resin film laminate metal sheet produced by the above-described method and cut to a size of 50 mm×100 mm were superposed at the heat sealed surfaces, and heated and pressure-bonded by a hot press, whereby a heat seal test piece was produced. Tables 4-1 to 4-6 show the heating and pressure bonding conditions of the hot press for the resin film laminate metal sheet and the resin laminate aluminum foil used in the heat seal test.

A method for measuring the peeling strength of the heat sealed portion will be described below.

The test piece heat sealed by the hot press is shear-cut to a size of 10 mm in width and 120 mm in length, and the resin laminate aluminum foil side was peeled by a length of 50 mm from the end of the test piece to form a gripping portion, the gripping portion of the test piece was fixed to a chuck part of a tension tester, and a tension test was conducted to measure the peeling strength of the heat sealed portion of the test piece. The tension test was conducted at room temperature (25° C.) at a tension rate of 200 mm/min.

The evaluation of the peeling strength of the heat sealed portion was determined according to the following criteria and shown in Tables 4-1 to 4-6 together with other evaluation results.

Excellent: 15 (N/10 mm)≤peeling strength
Good: 10 (N/10 mm)≤peeling strength<15 (N/10 mm)
Acceptable: 5 (N/10 mm)≤peeling strength<10 (N/10 mm)
Unacceptable: Peeling strength<5 (N/10 mm)

5. Heat Sealability Evaluation Method

The determination of the heat sealability was made based on whether or not a sufficient peeling strength of the heat sealed portion could be obtained within a heat sealing time of 1 second or shorter. The heat sealability evaluation method is shown below, and the evaluation results are shown in Tables 4-1 to 4-6 together with other evaluation results.

1) Heat seal sample preparation: The resin laminate aluminum foil and the resin laminate metal sheet cut to a size of 50 mm×100 mm were superposed at the heat sealed surfaces, and heated and pressure-bonded with a pressure of 10 N/cm² and a time described in Tables 4-1 to 4-6 as a pressure bonding time (heat sealing time) by the hot press at 180° C., whereby a heat seal sample was produced.

2) Retort treatment: The produced heat seal sample was immersed in tap water and subjected to a retort treatment at 125° C. for 30 minutes.

3) Sealing strength measurement: The sample after the retorting was cut into a width of 10 mm, and the T-type peeling strength was measured to obtain a sealing strength (tension rate 200 mm/min, measurement temperature 25° C.).

4) Heat sealability determination: A case where a peeling strength of 10 N/cm or more was stably obtained within a peeling length range of 50 mm was determined to be good, a case of a peeling strength of 5 N/cm or more and less than 10 N/cm within a peeling length range of 50 mm was determined to be acceptable, and a case where a part having a peeling strength of less than 5 N/cm within a peeling length range of 50 mm was revealed was determined to be unacceptable.

6. Heat Sealed Portion Sealability and Heat Sealed Lid Peelability Determination Determination of the sealability and peelability of the heat sealed portion of the heat sealed lid was performed by the following method, and the evaluation results are shown in Tables 4-1 to 4-6 together with other evaluation results.

1) Heat sealed lid production: The resin film laminate metal sheet which is to become a seamed side frame portion was formed into a frame for a heat sealed lid so that the can inner surface was the polyester-based resin and the outer surface side was the polyolefin-based resin, the heat sealed surfaces of a commercially available resin laminate aluminum foil for heat sealing and the produced frame for a heat sealed lid were aligned, and by pressurizing a heat sealing tool heated to 180° C. from both surfaces of the heat sealed portion at a pressure of 10 N/cm² for 1 second, a heat sealed lid was produced.

2) Can body retort test: The produced heat sealed lid was attached to a DRD can (body) filled with tap water up to 80% of the internal volume of the can, the lid was seamed by a can lid seaming device, thereafter the weight of the can body was measured with an electronic balance to the number of grams with one decimal place, and the resultant was subjected to a retort treatment in a retort oven at 125° C. for 30 minutes.

3) Can body heat sealed portion sealability determination: The weight of the can body subjected to the retort treatment was measured again with an electronic balance to the number of grams with one decimal place. In a case where the weight of the can body was reduced by 0.2 mass % or more, it was considered that liquid leakage had occurred and was regarded as being unacceptable. In a case where the weight reduction ratio was 0.05 mass % or more and less than 0.2 mass %, the weight loss was not so high that liquid leakage was determined and was determined to be acceptable. In a case where the weight reduction ratio was less than 0.05 mass %, the weight reduction ratio was within a measurement error range, so that the sealability of the heat sealed portion of the can body was determined to be good.

4) Heat sealed lid peelability determination: The heat sealed lid was peeled from the can body subjected to the retort treatment, and it was visually determined whether or not cracks or holes were generated in the heat sealed lid. The peelability was determined to be acceptable in a case where there was no crack or hole in the heat sealed lid, and determined to be unacceptable in a case where cracks or holes were generated.

As is clear from the examples and comparative examples, the heat sealed lid of the present invention has excellent heat sealing strength, heat sealability, and heat sealed portion sealability, does not cause fusion of the resin on the heat sealing side to the laminating roll when the resin laminate metal sheet of the seamed side frame portion of the heat sealed lid is manufactured, and thus provides stable productivity and excellent economic efficiency. In addition, the heel sealed lids of the examples have excellent surface quality because of their good external appearance.

INDUSTRIAL APPLICABILITY

The heat sealed lid and the can of the present invention have excellent productivity and stable heat sealed portion sealability and are thus extremely useful as a heat sealed lid and a can for food containers.

1 aluminum foil
2 first resin film
3 adhesion layer
4 base layer
5 intermediate layer
6 metal sheet
7 second resin film
8 outer surface coating
9, 11 base coating
10 chromium plated tinfree steel
12 inner surface coating
13 laminate film
21 resin laminate aluminum foil for a lid
22 resin film laminate metal sheet
30 compound
31 first seamed side frame portion
51 hot press
52 film laminating roll
53 water cooling tank
100 heat sealed lid 101 can body
103 curled portion
105 seamed portion
110 opening part
131 second seamed side frame portion
200 can body
S1 metal sheet heating step
S2 film laminating step
S3 cooling (water cooling) step
A1 first contact region
A2 second contact region

The invention claimed is:

1. A heat sealed lid comprising:
a laminated foil including an aluminum foil and a first resin film formed from a polyolefin-based resin covering one surface of the aluminum foil; and
a laminated metal sheet, where the laminated foil and the laminated metal sheet are heat sealed to one another;
the laminated metal sheet includes
a first contact region in contact with the first resin film,
a first seamed side frame portion on one end side of the first contact region,
a second seamed side frame portion on an other end side of the first contact region, and
an opening,
where the second seamed side frame portion is an upward-curl formed along the perimeter of said opening;
the laminated metal sheet in the first contact region includes
a second resin film formed from a thermoplastic polyester resin,
a metal sheet covering one surface of the second resin film, and
a laminate film covering one surface of the metal sheet on the side of the metal sheet opposite the second resin film, wherein the laminate film includes
a base layer which contains a maleic anhydride-modified polypropylene-based resin and is disposed on and in direct contact with the metal sheet,
an adhesion layer which is disposed on one side of the base layer and is in direct contact with and heat sealed to the first resin film, and
one or more intermediate layers between the adhesion layer and the base layer;
where the adhesion layer contains a first polypropylene-based resin and a polyethylene based resin, and an amount of the polyethylene-based resin in the adhesion layer is 1.0 mass % or more and 45.0 mass % or less of a total resin amount in the adhesion layer;
a melting point of the second resin film is 200° C. or higher and 300° C. or lower, and higher than a melting point of the adhesion layer by 40° C. or more;
a thickness of the adhesion layer is 1.0 μm or more and 15.0 μm or less;
a thickness of the base layer is 1.0 μm or more and 18.0 μm or less; and
the second seamed side frame portion defines a second contact region in which the first resin film of the laminated foil and the second resin film of the laminated metal sheet are in direct contact with each other, but are not fused together.

2. The heat sealed lid according to claim 1, wherein each of the one or more intermediate layers contains a second polypropylene-based resin.

3. A can comprising the heat sealed lid according to claim 1.

4. A can comprising the heat sealed lid according to claim 2.

* * * * *